(12) United States Patent
Jin et al.

(10) Patent No.: US 8,330,642 B2
(45) Date of Patent: Dec. 11, 2012

(54) IMAGING BY TIME REVERSAL BEAMFORMING

(75) Inventors: Yuanwei Jin, Salisbury, MD (US); Jose' M. F. Moura, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1054 days.

(21) Appl. No.: 12/217,838

(22) Filed: Jul. 9, 2008

(65) Prior Publication Data
US 2009/0076389 A1    Mar. 19, 2009

Related U.S. Application Data

(60) Provisional application No. 60/958,756, filed on Jul. 9, 2007.

(51) Int. Cl.
*G01S 13/00* (2006.01)
(52) U.S. Cl. ............... 342/22; 342/159; 342/195
(58) Field of Classification Search ........ 342/22, 342/159, 195
See application file for complete search history.

(56) References Cited

U.S. PATENT DOCUMENTS

| | | | |
|---|---|---|---|
| 4,633,253 A | 12/1986 | Stove et al. | |
| 5,428,999 A | 7/1995 | Fink | |
| 5,431,053 A | 7/1995 | Fink | |
| 6,470,275 B1 * | 10/2002 | Dubinsky | 702/9 |
| 6,699,189 B1 * | 3/2004 | Lin et al. | 600/437 |
| 2001/0037075 A1 * | 11/2001 | Candy | 601/2 |
| 2003/0005770 A1 | 1/2003 | Berryman | |
| 2003/0138053 A1 * | 7/2003 | Candy et al. | 375/259 |
| 2005/0094539 A1 | 5/2005 | Minemura et al. | |
| 2005/0146433 A1 | 7/2005 | Waltermann | |
| 2005/0273008 A1 | 12/2005 | Montaldo et al. | |
| 2007/0038060 A1 | 2/2007 | Cerwin et al. | |
| 2008/0045864 A1 * | 2/2008 | Candy et al. | 601/2 |

OTHER PUBLICATIONS

Baggeroer, Arthur, Kupennan, William, Mikhalevslty, Peter; An Overview of Matched Field Methods in Ocean Acoustics; IEE of Oceanic Engineering, 18(4); pp. 401-424; 1993.

Bond, Essex, Li, Xu, Hagness, Susan, Van Veen, Barry; Microwave Imaging Via Space-Time Beamforming for Early Detection of Breast Cancer; IEEE Transactions on Antennas and Propagation, 51(8); pp. 1690-1705; 2003.

Borcea, Liliana, Papanicolaou, George, Tsogka, Chrysoula, Berryman, James; Imaging and Time Reversal in Random Media; Inverse Problems, 18; pp. 1247-1289; 2002.

Boyd, Stephan, Ghaoui, Laurent, Feron, Eric, Balakrishnan, Venkataremanan; Linear Matrix Inequalities in System and Control Theory; SIAM Studies in Applied Mathematics; 1994.

Cepni, Ahmet; Experimental Investigation of Time-Reversal Techniques Using Electromagnetic Waves; Ph.D. Dissertation, Carnegie Mellon University; 2005.

(Continued)

*Primary Examiner* — Timothy A Brainard
(74) *Attorney, Agent, or Firm* — Jones Day

(57) ABSTRACT

A high resolution imaging system is used to detect and locate targets using time reversal in rich scattering environments, where the number of scatterers is significantly larger than the number of antennas. Our imaging system performs two major tasks by time reversal: clutter mitigation and target focusing. Clutter mitigation is accomplished through waveform reshaping to suppress the clutter returns. After the suppressed clutter is subtracted from the returned signal, a second time reversal for target focusing is performed. A final image is then obtained by beamforming.

24 Claims, 7 Drawing Sheets

OTHER PUBLICATIONS

Chambers, David, Berryman, James; Analysis of the Time-Reversal Operator for a Small Spherical Scatterer in an Electromagnetic Field; IEEE Transactions on Antennas and Propagation, 52(7); pp. 1729-1738; 2004.

Devaney, Anthony; Time Reversal Imaging of Obscured Targets from Multistatic Data; IEEE Transaction on Antennas and Propagation, 53(5); pp. 1600-1610; 2005.

Devaney, Anthony; Using Field Correlations to Estimate Green's Functions From Experimental Data; Unpublished manuscript; 2004.

Devaney, Anthony, Marengo, Edwin, Gruber, Fred; Time-Reversal-Based Imaging and Inverse Scattering of Multiply Scattering Point Targets; Journal of the Acoustical Society of America, 118(5); pp. 3129-3138; 2005.

Fear, E.C., Stuchly, M.A.; Microwave Detection of Breast Cancer; IEEE Transactions on Microwave Theory and Techniques, 48(11); pp. 1854-1863; 2000.

Fink, Mathias, Prada, Claire, Wu, Francois, Cassereau, Didier; Self Focusing in Inhomogeneous Media With 'Time Reversal' Acoustic Mirrors; IEEE Ultrasonics Symposium, 1; pp. 681-686; 1989.

Fink, Mathias; Time Reversal of Ultrasonic Fields—Part I: Basic Principles; IEEE Transactions on Ultrasonic, Ferroelectronic, and Frequency Control, 39(5); pp. 555-566; 1992.

Fink, Mathias; Time Reversed Acoustics; Physics Today, 50(3); pp. 34-40; 1997.

Fink, Mathias, Cassereau, Didier, Derode, Arnaud, Prada, Claire; Roux, Philippe, Tanter, Mickael, Thomas, Jean-Louis; Wu, Francois; Time-Reversed Acoustics; Reports on Progress in Physics, 63(12); pp. 1933-1995; 2000.

Gruber, Fred, Marengo, Edwin, Devaney, Anthony; Time-Reversal Imaging with Multiple Signal Classification Considering Multiple Scattering Between the Targets; Journal of the Acoustical Society of America, 115(6); pp. 3042-3047; 2004.

Henty, Benjamin, Stancil, Daniel; Multipath-Enabled Super-Resolution for rf and Microwave Communication Using Phase-Conjugate Arrays; Physical Review Letters, 93(24); p. 243904; 2004.

Horn, Roger, Johnson, Charles; Matrix Analysis; Cambridge University Press: New York, NY; 1985.

Jin, Yuanwei, Moura, Jose; Asymptotic Noise Analysis of Time Reversal Detection; The 40th Asilomar Conference on Signals, Systems and Computers; Pacific Grove, CA; pp. 772-776; 2006.

Jin, Yuanwei, Moura, Jose; TR-SAR: Time Reversal Target Focusing in SAR; Proceedings of the International Conference on Acoustics, Speech and Signal Processing (ICASSP' 07); pp. 957-960; 2007.

Jorgenson, Roy, Mittra, Raj; Efficient Calculation of the Free-Space Periodic Green's Function; IEEE Transactions on Antennas and Propagation, 38(5); pp. 533-642; 1990.

Kuperman, W.A., Hodgkiss, William, Song, Hee Chun, Akal, T., Ferla, C., Jackson, Darrell; Phase Conjugation in the Ocean: Experimental Demonstration of an Acoustic Time-Reversal Mirror; Journal of the Acoustical Society of America, 103(1); pp. 25-40; 1998.

Larsen, Lawrence, Jacobi, John; Medical Applications of Microwave Imaging; IEEE Press: New York, NY; 1986.

Lehman, Sean, Devaney, Anthony; Transmission Mode Time-Reversal Super-Resolution Imaging; Journal of the Acoustical Society of America, 113(5); pp. 2742-2753; 2003.

Mahafza, Bassem, Elsherbeni, Atef; MATLAB Simulations for Radar System Design; CRC Press: Boca Raton, FL; 2003.

Meaney, Paul, Fanning, Margaret, Li, Dun, Poplack, Steven, Paulsen, Keith; A Clinical Prototype for Active Microwave Imaging of the Breast; IEE Transactions on Microwave Theory and Techniques, 48(11); pp. 1841-1853; 2000.

Mitchell, Andrew, Griffiths, D.; The Finite Difference Method in Partial Differential Equations; John Wiley & Sons: New York, NY; 1980.

Morse, Philip, Feshbach, Herman; Methods of Theoretical Physics, Part I; McGraw-Hill: New York, NY; 1953.

Moura, Jose, Jin, Yuanwei; Detection by Time Reversal: Single Antenna; IEEE Transactions on Signal Processing, 55(1); pp. 187-201; 2007.

Moura, Jose, Jin, Yuanwei, Stancil, Dan, Zhu, Jian-Gang, Cepni, Ahmet, Jiang, Yi, Henty, Ben; Single Antenna Time Reversal Adaptive Interference Cancelation; ICASSP '05, IEEE International Conference on Signal Processing, 4; pp. 1121-1124; 2005.

Oestges, Claude, Kim, Arnold, Papanicolaou, George, Paulraj, Arogyaswami; Characterization of Space-Time Focusing in Time Reversed Random Fields; IEEE Transactions on Antennas and Propagation, 53(1); pp. 283-293; 2005.

Oppenheim, Alan, Willsky, Alan, Nawab, S. Hamid; Signals & Systems, 2nd Edition; Prentice-Hall, Inc.: Upper Saddle River, NJ; 1996.

Prada, Claire, Wu, Francois, Fink, Mathias; The Iterative Time Reversal Mirror: A Solution to Self-Focusing in the Pulse Echo Mode; Journal of the Acoustical Society of America, 90(2.1); pp. 1119-1129; 1991.

Prada, Claire, Thomas, Jean-Louis; Experimental Subwavelength Localization of Scatterers by Decomposition of the Time Reversal Operator Interpreted as a Covariance Matrix; Journal of the Acoustical Society of America, 114(1); pp. 235-243; 2004.

Shi, Gang, Nehorai, Ayre; Maximum Likelihood Estimation of Point Scatterers for Computational Time-Reversal Imaging; Communications in Information and Systems, 5(2); pp. 227-256; 2005.

Snieder, R., Scales, J.; Time-Reversal Imaging as a Diagnostic of Wave and Particle Chaos; Physical Review E, 58(5); pp. 5668-5675; 1998.

Song, Hee Chun, Kuperman, W.A., Hodgkiss, William, Akal, T., Ferla, C.; Iterative Time Reversal in the Ocean; Journal of the Acoustical Society of America, 105(6); pp. 3176-3184; 1999.

Surowiec, Andrzej, Stuchley, Stanislaw, Barr, J. Robin; Swarup, Arvind; Dielectric Properties of Breast Carcinoma and the Surrounding Tissues; IEEE Transactions on Biomedical Engineering, 35(4); pp. 257-263; 1988.

Wehner, Donald; High Resolution Radar; Artech House: Norwood, MA; 1987.

* cited by examiner

Figure 1: Left: FIG1 A. Right: FIG1 B

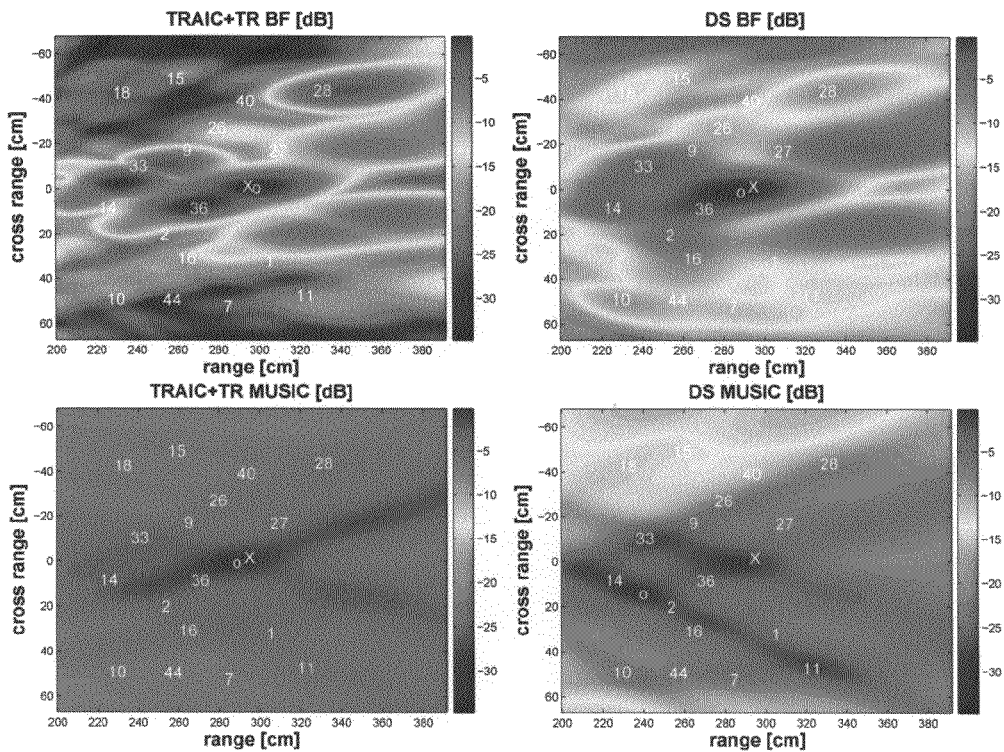
Figure 5: Upper left: FIG5 A. Upper right: FIG5 B. Lower left: FIG5 C. Lower right: FIG5 D
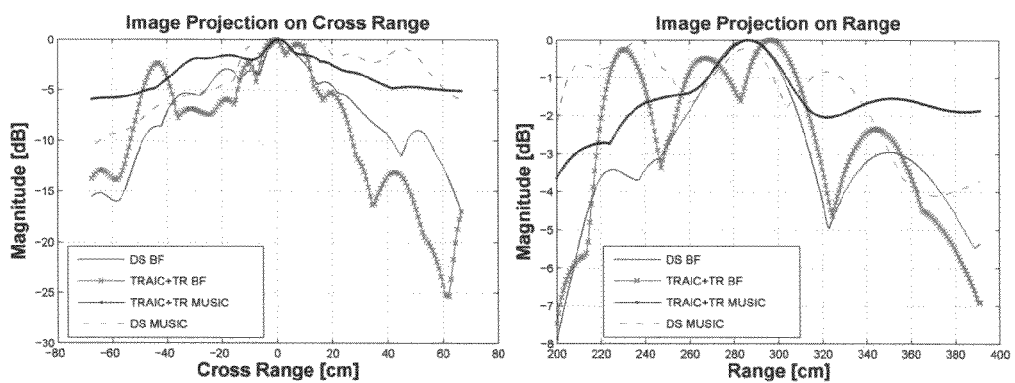
Figure 6: Left: FIG6 A. Right: FIG6 B

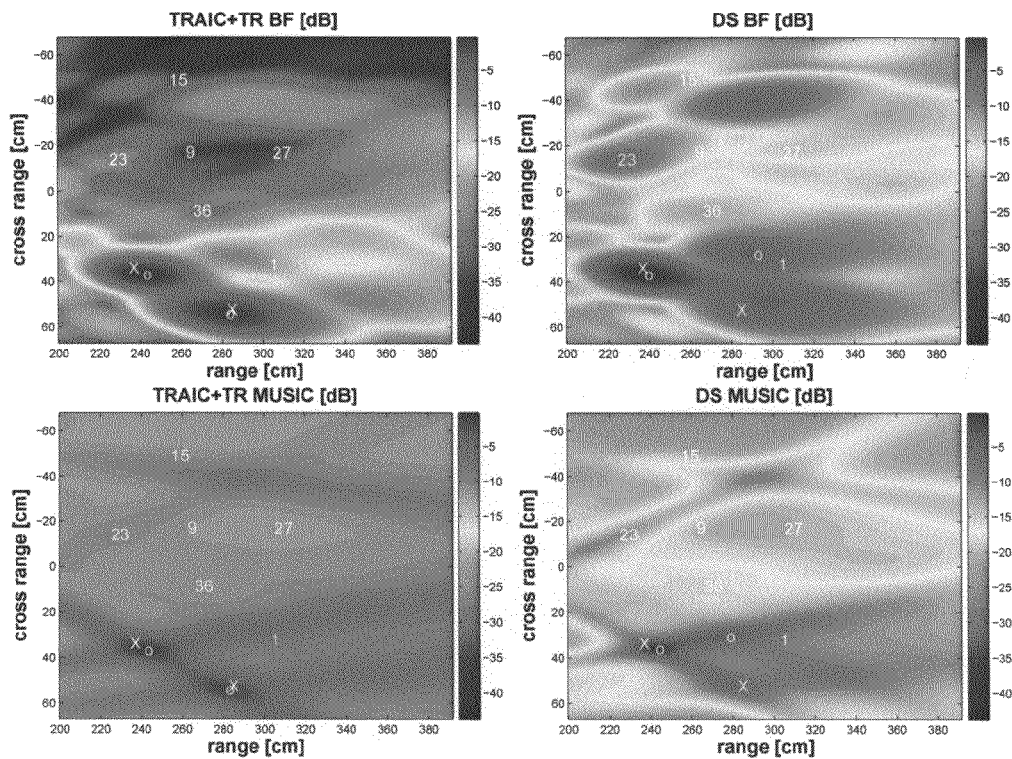
Figure 7: Upper left: FIG 7A. Upper right: FIG7 B. Lower left: FIG7 C. Lower right: FIG7 D
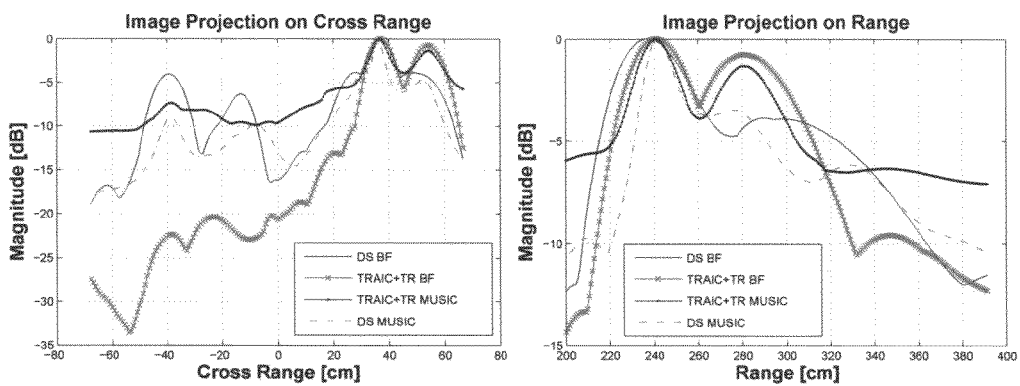
Figure 8: Left: FIG8 A. Right: FIG8 B

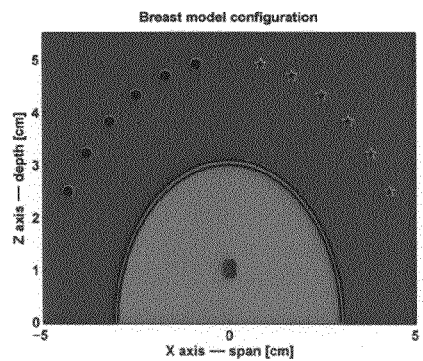
Figure 9: FIG9
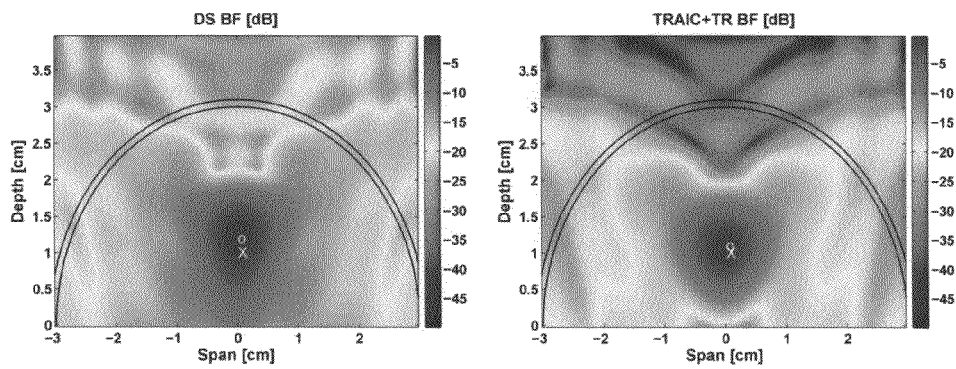
Figure 10: Left: FIG10 A. Right: FIG10 B
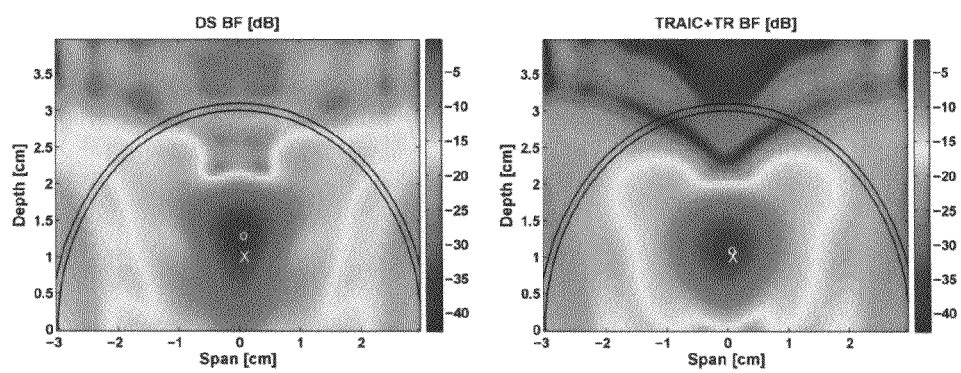
Figure 11: Left: FIG11 A. Right: FIG11 B

IMAGING BY TIME REVERSAL BEAMFORMING

CROSS REFERENCE TO RELATED APPLICATIONS

The present application claims priority from copending U.S. Application Ser. No. 60/958,756 entitled Time Reversal for Synthetic Aperture Imaging and Medical Imaging filed Jul. 9, 2007, which is hereby incorporated by reference for all purposes.

GOVERNMENT RIGHTS

This disclosure was supported by DARPA Grant No. W911NF-04-1-0031. The government may have rights in this invention.

REFERENCE TO COLOR FIGURES

The patent or application file contains at least one drawing executed in color. Copies of this patent or patent application publication with color drawings will be provided by the Office upon request and payment of the necessary fee.

BACKGROUND

The present disclosure is directed to a novel use of time reversal in imaging applications.

Locating and imaging targets buried in high clutter poses considerable challenges. Detection and imaging algorithms suffer significant performance loss because the channel Green's function is very different from the direct path model that these algorithms usually assume. In complex channels, for example, when the propagation speed profile is spatially varying or due to boundary layers, the use of numerical codes that integrate the wave equation, like matched field processing (MFP) in underwater acoustics, e.g., [1], provides the channel Green's function. But MFP is prohibitively expensive in most applications and is highly sensitive to accurate knowledge of the environmental conditions.

This disclosure explores how time reversal (TR) can be used in localizing targets in highly cluttered environments. References [2], [3], [4], [5], [6] have shown the power of time reversal to focus with super-resolution on a source in a highly dispersive medium by time reversing and retransmitting the time dispersed signal received at an array of sensors. References [7], [8] demonstrate super-resolution focusing in underwater acoustics and reference [9] demonstrates focusing in the electromagnetic domain. Focusing results from the time reversibility of the wave equation in a non-absorbing medium: The highly dispersed back-propagated field is time reversed (or phase conjugate in the frequency domain), energy normalized, resent, and focuses on the radiating source. The more inhomogeneous the media is, the higher the focusing resolution achieved. Intuitively, time reversal is equivalent to generating a virtual aperture larger than its actual physical size, yielding a much higher resolution. Beyond focusing, recent works on time reversal imaging include Lehman and Devaney [10], Devaney [11], Prada and Thomas [12], Borcea et al. [13], [14], and the references therein. In these works, the Multiple Signal Classification (MUSIC) algorithm is combined with time reversal for locating well resolved targets, where the MUSIC spectrum is constructed by eigen-decomposing the so called time reversal matrix. This approach is applicable only when the number of scatterers in the imaged area is smaller than the number of antennas because the generalized MUSIC spectrum requires that the number of scatterers be smaller than the number of antennas.

SUMMARY

In [15], we studied detection with time reversal. We showed for the electromagnetic (EM) domain that time reversal provides significant gains when detecting targets buried in clutter using a single sensor. In this disclosure, we consider localization of targets in high clutter for radar (electromagnetic) data, which we also refer to as imaging. We present a new high resolution time-reversal imaging algorithm, the Time Reversal Adaptive Interference Canceler (TRAIC) followed by time reversal beamforming (TRBF). Unlike time reversal MUSIC based algorithms, TRAIC-TRBF only requires the number of antennas to be larger than the number of potential targets, regardless of the number of scatterers in the illuminated region. The TRAIC algorithm reshapes the time reversed backscatter from the clutter to minimize the energy returns from the clutter at the array. In contrast with focusing, the goal of TRAIC is anti-focusing, i.e., nulling the EM energy received at the transmit/receive radar backscattered by the clutter. Probing the cluttered environment with the reshaped, time reversed waveform whitens and suppresses the backscatter from the clutter. Subtracting out the whitened and suppressed clutter backscatter results in the residual backscatter from the target. The second stage, TRBF, time reverses the residual backscatter from the target and resends it into the medium to focus on the target. The high resolution achieved at this stage by time reversal generates a narrow beam, which provides high resolution in localization and imaging.

The proposed TRAIC+TRBF algorithm images a target scene using time reversal twice. The first time reversal step plus reshaping nulls (whitens) the clutter; the second time reversal step focuses on the target. The target data matrix defined in (19), supra, in dense scattering, contains both the direct reflection between the target and the receive array, and the secondary reflections between the scatterers, the target, and the receive array. The clutter nulling step suppresses the clutter reflections, not the secondary scattering between the target, the scatterers, and the receiver. The target focusing step back propagates the wavefield and focuses on the target. After the target focusing step, the measurements contain the energy focused wavefield; then, we apply a beamformer weight vector to locate the target.

Because the focused wavefield contains direct and secondary scattering, ideally, the weight vector, i.e., the field Green's function, should combine the direct reflection from the target to the receiver, and the secondary scattering due to the presence of the surrounding scatterers. In our algorithm, we use only the direct path Green's function, which, in a sense, is equivalent to the Born approximation [24]. This avoids having to locate the scatterers, which is challenging in high scattering environments. But, high scattering environment is exactly where time reversal makes a difference, and so, our method of nulling the scatterers before focusing on the targets, avoids having to resolve the scatterers, still providing good target imaging performance. This simplification, however, may explain why, in the experiment with 17 scatterers and 1 target, reported in FIG. 5, some local maxima are close to the global maxima.

BRIEF DESCRIPTION OF THE FIGURES

The present disclosure is described, for purposes of illustration and not limitation, in connection with the following figures, wherein:

FIG. 1A illustrates a multi-static antenna configuration while FIG. 1B illustrates an experimental setup implementing the multi-static configuration shown in FIG. 1A;

FIGS. 5A-5D illustrate test results, A is for TRAIC+TRBF, B is for DSBF, C is for TRAIC+TR MUSIC, and D is for DS-MUSIC. All images are plotted within the same range (0 dB to −34 dB);

FIGS. 6A and 6B illustrate projections onto cross range and range, respectively, for the images in FIG. 5. TRIAC shows a narrower main lobe, deeper null, and lower sidelobes relative to direct subtraction imaging;

FIGS. 7A-7D illustrate another set of test results, A is for TRAIC+TRBF, B is for DSBF, C is for TRAIC+TR MUSIC, and D is for DS-MUSIC. All images are plotted within the same range (0 dB to −45 dB);

FIGS. 8A and 8B illustrate projections onto cross range and range, respectively, for the images in FIG. 7. TRIAC+TRBF yields two lobes corresponding to two target locations;

FIG. 9 is a simplified breast model. Two antenna arrays A and B, denoted by the circles and pentagrams, respectively, are placed on the surface of the breast. The thick layer of 1 mm is the skin. Normal breast tissues are inside the skin layer. A tumor is surrounded by normal tissues;

FIG. 10A illustrates the results using the disclosed TR beamforming while FIG. 10B illustrates the results using conventional beamforming, where the conductivity is zero; and FIG. 11A illustrates additional results using the disclosed TR beamforming while FIG. 11B illustrates the results using conventional beamforming, where the conductivity is zero.

DETAILED DESCRIPTION

Figure 1:
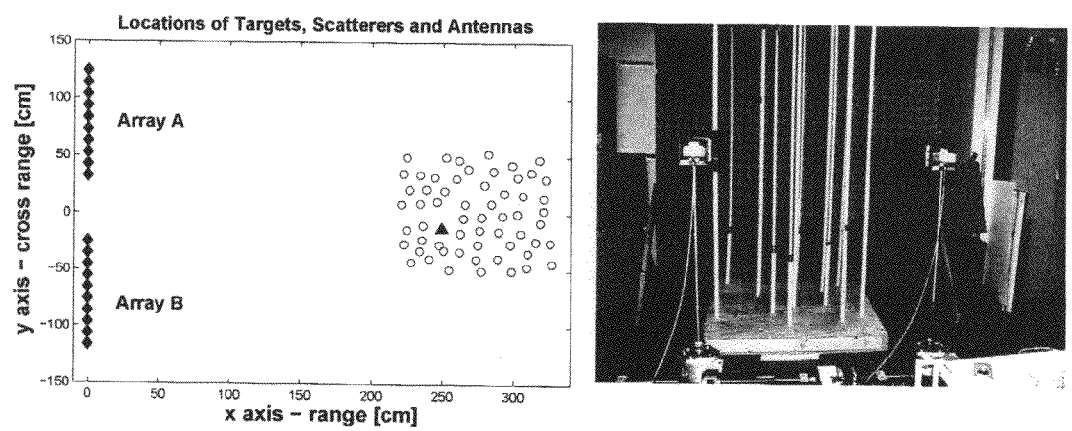

Physical and mathematical time reversal. We describe time reversal in this disclosure as if the signals were physically time reversed and retransmitted. In practice, in many situations, there is no need to actually physically retransmit the time reversed signals—in this case, the time reversal steps in TRAIC-TRBF become algorithmic steps with no need for additional signal retransmission. When time reversal is used as an algorithmic step, with no physical retransmission of the signals, we refer to it as mathematical time reversal.

I. Notation.

We use lower case boldface letters to denote vectors and upper case boldface letters to denote matrices, respectively. In addition, we adopt the following conventions throughout this disclosure, $(\cdot)^*$ for conjugate; $(\cdot)^T$ for transpose; $(\cdot)^H$ for Hermitian transpose; diag[x] for the diagonal matrix whose diagonal is the vector x; $\|\cdot\|$ for the vector (matrix) Frobenius norm; $I_m$ for the identity matrix of order m; det(A) for the determinant of matrix A; and the inner product notation $(x, y) = x^H y$.

II. Data Model

We present in this section the data model that we adopt. Subsection II-A discusses a stepped frequency synthesis of the transmitted signals, subsection II-B the array configuration, and subsection II-C the multi-static response matrix and the time reversal matrix.

A. Stepped Frequency Synthesis

The illuminating signal s(t), t∈[0 T], has Fourier transform $S(\omega)$, $\omega \in [\omega_0, \omega_0+B]$ The signal has duration T and bandwidth B. Time reversal of a real valued signal is simply phase conjugation in the frequency domain, i.e., the Fourier transform of s(−t) is $S^*(\omega)$ (see Oppenheim and Willsky, [16].) In practice, for realizable signals with finite duration T, the realizable version of the time reversed signal follows by delaying by $T_c$ the time reversed signal, which introduces a phase shift $e^{j\omega T_c}$ in the frequency domain. We ignore this phase shift in the sequel.

Real time synthesis in the time domain of the signal s(t) at the radar frequencies of interest requires expensive instrumentation. In section IV, these cost considerations lead us, instead, to synthesizing by a stepped frequency approach the transmitted signals, e.g., Wehner [17] and Mahafza [18]. In this disclosure we transmit a series of bursts of narrow band pulses where each burst is a sequence of Q pulses stepped (shifted) in frequency from pulse to pulse by a fixed frequency step size $\Delta\omega$. The Q monochromatic signals sample uniformly the wideband signal spectrum $S(\omega)$ at the frequencies $$\forall\, 0 \le q \le Q-1 : \omega_q = \omega_0 + q\Delta\omega, \quad (1)$$

where we choose $$\omega_0 = \frac{2\pi}{T(Q-1)} q_1, \; q_1 \text{ is an integer} \quad (2)$$

$$\Delta\omega = \frac{\omega_{Q-1} - \omega_0}{Q-1}, \quad (3)$$

which leads to $$\forall\, 0 \le q \le Q-1 : \omega_q = \frac{2\pi}{T(Q-1)}(q_1 + q). \quad (4)$$

Care must be taken when sampling a signal in the frequency domain. Uniformly sampling by $\Delta\omega$ the signal bandwidth B, replicates the original signal in the time domain.

$$\tilde{s}(t) = \frac{1}{\Delta\omega} \sum_n s\left(t - \frac{2\pi}{\Delta\omega} n\right). \quad (5)$$

To avoid overlapping the time domain replicas of duration T, the frequency sampling should be dense enough, i.e., upper bounded as $$\Delta\omega = \frac{B}{Q-1} \le \frac{2\pi}{T}.$$

B. Array Configuration

We adopt the multi-static configuration shown in FIG. 1A. The scene is in the (x, y)-plane and the region of interest is partitioned into a finite number of pixels in range and cross range. The imaging radar in FIG. 1A. 1 has a pair of antenna arrays A and B located along the y-axis: $A=(A_0, \ldots, A_{P-1})$ with P antennas and $B=(B_0, \ldots, B_{N-1})$ with N antennas. FIG. 1B shows the experimental set-up used in Section IV. Two horn antennas are mounted on rails and move to synthesize uniform linear arrays. The scatterers and the targets are mounted on a platform.

C. Multi-static Response Matrix and Time Reversal Matrix

We introduce in this section two matrices that play an important role in time reversal techniques: the multi-static response matrix and the time reversal matrix.

Multi-static Response Matrix $K(\omega_q)$. With respect to FIG. 1A, let $K(\omega_q; B_n \leftarrow A_p)$ denote the frequency response of the propagation channel between the p-th transmit antenna $A_p$ and the n-th receive antenna $B_n$ at the discrete angular frequency $\omega_q$. "Channel" in this disclosure simply refers to the medium or environment through which the signals propagate. We organize the total of N P channel responses into the N×P multi-static response matrix $K(\omega_q)$ at frequency $\omega_q$ (e.g., Lehman and Devaney, [10], [19], and Chambers [20].) We now determine the structure of this matrix in terms of the Green's functions characterizing the media propagation between antennas and scattering centers or targets. We consider first the single target case in a highly cluttered environment. The case of multiple targets follows by superposition of all the target reflections, neglecting secondary scattering between targets.

Single target. Let $x_t$, $r_{B_n}$, and $r_{A_p}$ denote the locations of the target, of the n-th antenna $B_n$ of array B, and of the p-th antenna $A_p$ of array A, respectively. The (n, p)-th entry of $K(\omega_q)$ is:

$$[K(\omega_q)]_{n,p} = k(\omega_q; B_n \leftarrow A_p), \quad (6)$$

$$= G(r_{B_n}, x_t; \omega_q)\tau(x_t; \omega_q)G(x_t, r_{A_p}; \omega_q), \quad (7)$$

where $\tau(x_t; \omega_q)$ is the complex reflectivity of the point target at location $x_t$, and $G(r, r'; \omega_q)$ is the Green's function of the background medium between locations r' and r at frequency $\omega_q$. In signal frequency terms, the Green's function is the channel response at location r to an impulse at location r'. Often, the Green's function satisfies the reciprocity relation:

$$G(r, r'; \omega_q) = G(r', r; \omega_q). \quad (8)$$

We assume that the medium is reciprocal and that (8) holds. An example of a Green's function, is the 'background' or free space Green's function, [21], [22], $$G(r, r'; \omega_q) = \frac{1}{4j} H_0^{(2)}(k_q|r - r'|), \quad (9)$$

where $H_0^{(2)}$ is the zeroth-order Hankel function of the second kind, $k_q = \omega_q/c$ is the wavenumber of a propagating wave with angular frequency $\omega_q$ and c is the medium propagation velocity. In the near field, the free space Green's function can be approximated as $$G(r, r'; \omega_q) \approx -\sqrt{\frac{1}{8\pi k_q}} \frac{e^{-jk_q|r-r'|}}{|r-r'|}, \text{ for } |r - r'| > 3\lambda. \quad (10)$$

In the far field, the Green's function is simply a delay $$G(r, r'; \omega_q) \approx e^{-jk_q|r-r'|}. \quad (11)$$

The "direct path" Green's functions hold under the Born approximation, or weak scattering condition, and in general does not hold when multiple scattering is non-negligible. For a discussion on the Born approximation and the multiple scattering Foldy-Lax approximation in the context of time reversal imaging, readers can refer to [23], [24], [25].

We first consider the receiving array to be at points $r_{B_i}$, i=0, . . . , N−1. Stacking the Green's functions $G(r_{B_i}, x_t; \omega_q)$ from the target $x_t$ to each of the array elements $B_i$, i=0, . . . , N−1, into an N-dimensional vector, define the receive array response vector at array B for a target at $x_t$ as:

$$g_B(x_t; \omega_q) = [G(r_{B_0}, x_t; \omega_q), \ldots, G(r_{B_{N-1}}, x_t; \omega_q)]^T. \quad (12)$$

In the far field, and for a linear equi-spaced array, $g_B(x_v; \omega_q)$ reduces to the N-dimensional conventional steering vector $$g_B(x_t; \omega_q) \approx \left[1, e^{-j2\pi \frac{d}{\lambda_q}\sin\theta}, \ldots, e^{-j2\pi \frac{d}{\lambda_q}\sin\theta}\right]^T, \quad (13)$$

where θ is the azimuth angle, d is the inter-element spacing, $$\lambda_q = \frac{2\pi c}{\omega_q}$$

is the wavelength at frequency $\omega_q$, and c is the speed of light.

Similar to equation (12), the P-dimensional transmit array response vector is $$g_A(x_t; \omega_q) = [G(x_t, r_{A_0}; \omega_q), \ldots, G(x_t, r_{A_{P-1}}; \omega_q)]^T. \quad (14)$$

Applying equations (12) and (14) to (7) yields a revealing subspace representation of the N×P response matrix $K(\omega_q)$:

$$K(\omega_q) = \tau(x_t; \omega_q) g_B(x_t; \omega_q) g_A^T(x_t; \omega_q). \quad (15)$$

Multiple targets. In general, if there are M well resolved targets, and neglecting in this discussion the secondary scattering among targets, the target response matrix is the superposition of the individual target responses given by (15), i.e., $$K(\omega_q) = \sum_{m=1}^{M} \tau(x_{t,m}; \omega_q) g_B(x_{t,m}; \omega_q) g_A^T(x_{t,m}; \omega_q), \quad (16)$$

$$= G_B(\omega_q) \Pi G_A(\omega_q), \quad (17)$$

where Π is the diagonal matrix of target reflectance $\tau(X_{t,m}; \omega_q)$ and the N×M matrix $G_B(\omega_q)$ and the P×M matrix $G_A(\omega_q)$ collect the array response vectors in (12) and (14) for the array B and the array A, respectively, $$\Pi = \text{diag}[\tau(x_{t,1}; \omega_q), \ldots, \tau(x_{t,M}; \omega_q)],$$

$$G_B(\omega_q) = [g_B(x_{t,1}; \omega_q), \ldots, g_B(x_{t,M}; \omega_q)],$$

$$G_A(\omega_q) = [g_A(x_{t,1}; \omega_q), \ldots, g_A(x_{t,M}; \omega_q)]. \quad (18)$$

Time Reversal Matrix $T(\omega_q)$ The time reversal matrix, e.g., [5], [4], is $$\forall 0 \leq q \leq Q-1: T(\omega_q) = K^T(\omega_q) K^*(\omega_q).$$

Clutter and Target Multi-static Response Matrices. In this disclosure we distinguish between the following three multi-static response matrices: the clutter channel multi-static response matrix $K_c(\omega_q)$ when only scatterers are present; the clutter plus target channel multi-static response matrix $K_{c+t}(\omega_q)$ when both scatterers plus target are present; and the target channel multi-static response matrix $$K_t(\omega_q) = K_{c+t}(\omega_q) - K_c(\omega_q). \quad (19)$$

As an abuse of terminology, we will simply refer to these matrices as the scatterers or clutter channel response, the clutter plus target channel response, and the target channel response, respectively.

The structure of $K_c(\omega_q)$ and $K_t(\omega_q)$ follows equation. (7), i.e., $$[K_c(\omega_q)]_{n,p} = k_c(\omega_q; B_n \leftarrow A_p) \quad (20)$$

$$[K_t(\omega_q)]_{n,p} = k_t(\omega_q; B_n \leftarrow A_p), \quad (21)$$

where $k_c(\omega_q; B_n \leftarrow A_p)$ and $k_t(\omega_q; B_n \leftarrow A_p)$ are the clutter and target responses between antennas $A_p$ and $B_n$, respectively.

III. TRAIC–TRBF: Mathematical Description

In this section, we describe a time reversal based algorithm to image targets in rich scattering scenes—the time reversal adaptive interference canceler time reversal beamformer (TRAIC–TRBF); see also preliminary work in [26]. We start by clarifying the terminology. In many radar applications, and in this disclosure, imaging means constructing a reflectivity grid map of a region of interest (ROI), which is sampled by a finite number of grid cells, or pixels. Pixels that have computed reflectivity exceeding the background are identified as targets.

To image a target in high density clutter, we could attempt to locate the clutters and then use these data in the Green's function of the channel to model the secondary scattering from the clutter to the target and determine the position of the target—mimicking in a sense matched field processing. This approach suffers from the burden of having to locate accurately the clutter positions. For example, narrowband MUSIC requires that the number of sensors in the array be larger than the number of clutters. In heavy clutter, this is not the case and techniques like these have limited applicability. With TRAIC–TRBF, we adopt a different strategy. We avoid all together the step of locating the clutters. Instead, we time reverse the clutter returns and reshape this time reversed waveform so that, after retransmission, we minimize (null, cancel, or whiten) the clutters' backscatter received back at the original transmitting array. This strategy mitigates the clutter response and reinforces the return from the target. The clutter mitigation stage is followed by a second stage of time reversal that focuses the retransmitted signal on the target, with little backscatter to the array from the scatterers. In other words, we first time reverse and reshape to anti-focus on the clutter, and then we time reverse the returns to focus on the target. Because the backscatter from the clutter is reduced by TRAIC–TRBF, we do not need a sophisticated propagation model and a simple direct path is usually sufficient to locate the target.

Figure 2:
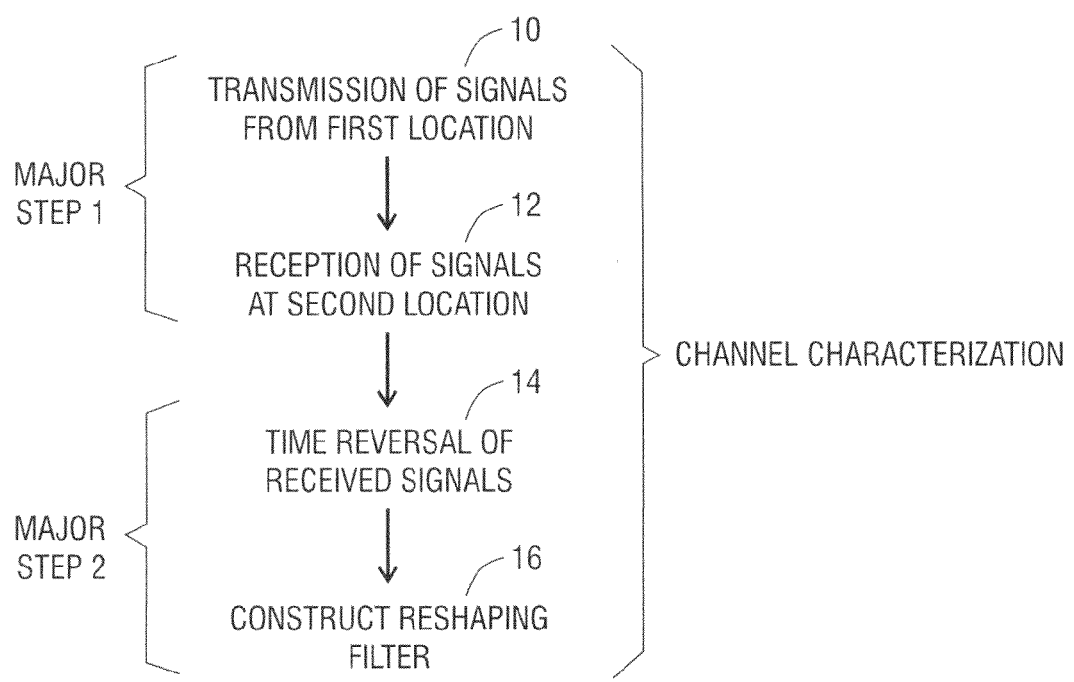
FIG. 2 illustrates a method of characterizing a transmission channel according to the present disclosure.
Figure 3:
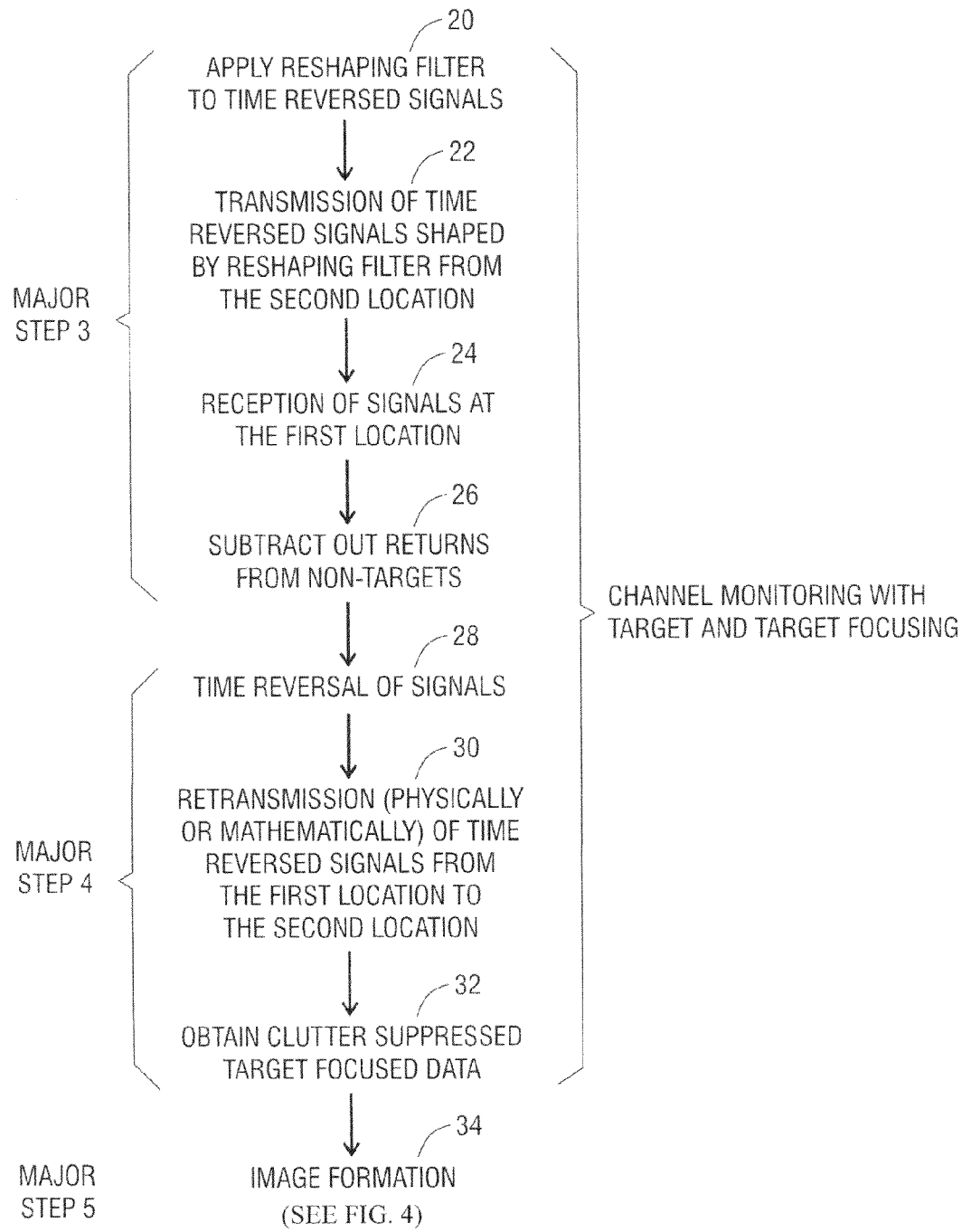
FIG. 3 illustrates a method of monitoring the transmission channel which may have a target present, and a method of target focusing according to the present disclosure.

We now present formally the time reversal adaptive interference canceler time reversal beamforming (TRAIC–TRBF) method and algorithm. It is designed to image (locate) targets in highly dense cluttering environments. As mentioned, our method performs two tasks, clutter mitigation and target focusing, through a series of transmission and processing steps. There are a total of five major steps: clutter channel probing; time reversal waveform reshaping for clutter cancellation; target channel monitoring; time-reversal target focusing; and, finally, image formation by, for example, beamforming and triangulation. Each of these major steps is broken down into smaller component steps as shown in FIGS. 2 and 3. The first three major steps constitute TRAIC, while the last two major steps are the TRRF. The first two major steps of TRAIC learn the clutter channel and construct a whitening filter for clutter mitigation as shown in FIG. 2. This allows us to subtract out the clutter component in each of the three subsequent major steps shown in FIG. 3. Major step 3 monitors the target channel, major step 4 time reverses the returns from the reshaped target waveform to focus on the target, and major step 5 uses beamforming and triangulation to form the image. TRAIC–TRBF uses time reversal twice–first, to adaptively anti-focus, null, cancel, or whiten the clutter; second, to focus on the target.

Subsection III-A details TRAIC–TRBF. Subsection III-B derives the weight vectors used in beamforming the data in major step 4. Subsection III-C presents an alternative imager, the TRAIC–TR MUSIC, where we combine TRAIC and TR with MUSIC. This algorithm is compared to TRAIC–TRBF in Section IV.

A. TRAIC–TRBF

Major Step 1: Clutter channel probing (A→B). This is the training step in which there exist only scatterers. The goal of this step is to estimate very reliably from the received data the clutter channel frequency response $K_c(\omega_q)$. This stage assumes that only clutter and no targets are present. This is realistic in many applications where one can survey the area of interest before it becomes active. We first consider, without loss of generality, that the probing signal is transmitted from antenna $A_p$ (See 10, FIG. 2) and received at the N sensors of array B (see 12, FIG. 2); by reversing the argument, we obtain similar results when the signal is first transmitted from the sensors at B and received by the P sensors at A. Each antenna $A_p$ is individually excited and radiates monochromatic signals with frequencies $\omega_q$, $q=0 \ldots, Q-1$, one frequency $\omega_q$ a time. The scattered returns from the signal transmitted from antenna $A_p$ at frequency $\omega_q$ are received at antennas $B_n$, $n=0, \ldots, N-1$, and collected in the N-dimensional array B received signal vector $r_p(\omega_q)$. We assume that the probing step can be repeated several times to average out possible measurement noise, i.e., we assume that we have $m=1, \ldots, M$ noisy snapshots $$r_{p,m}(\omega_q) = K_c(\omega_q) e_p S(\omega_q) + n_m(\omega_q), \quad m=1, \ldots, M, \tag{22}$$

where $e_p$ is the vector whole p-th entry is 1 and 0 elsewhere and $n_m(\omega_q)$ is additive noise. From these M snapshots, we can estimate accurately the clutter channel frequency response.

For example, for white Gauss noise, taking $S(\omega_q)=1$, $q=0, \ldots Q-1$, we get that the p-th column of $K_c(\omega_q) e_p$ is estimated by $$\hat{K}_c(\omega_q) e_p = \frac{1}{M} \sum_{m=1}^{M} r_{p,m}(\omega_q) \approx K_c(\omega_q) e_p. \tag{23}$$

We repeat this process for all the antennas $A_p$, $p=0, \ldots P-1$ which leads to estimates of the P columns of $K_c(\omega_q)$. From this clutter channel probing step, we conclude that $$\hat{K}_c(\omega_q) \approx K_c(\omega_q)$$

and so the clutter channel frequency response can be safely assumed to be accurately determined by steps 10 and 12.

Major Step 2: Waveform reshaping for clutter cancellation. The signals received by array B scattered by the clutter in step 1 are widely spread in time. Intuitively, if we time reverse these signals and retransmit them from B, they will focus on the clutters—this is the common goal of time reversal. To image in a highly cluttered environment, we propose an alternative goal for time reversal. Rather than focusing, we first rime reverse the received signals at 14 and construct a filer at 16 for reshaping the time reversed signals so that they avoid the clutters, once retransmitted from B. We refer to this as clutter nulling, clutter cancellation, or whitening of the clutter returns. This is the goal of major step 2 and we explain it now.

At 14 we time reverse the backscattered signals received at array B. As mentioned before, apart a time delay, this corresponds to phase conjugation in the frequency domain. Then we construct at 16 a reshaping filter that reshapes and energy normalizes the time reversed backscatter. This is achieved by a reshaping filter, which at frequency $\omega_q$ is represented by the N×N matrix $W(\omega_q)$. Turning briefly to FIG. 3, the reshaped signal vector transmitted from array B shown by step 22 is $$\forall 0 \leq p \leq P-1: x_p(\omega_q) = W(\omega_q) K^*_c(\omega_q) S^*(\omega_q) e_p. \tag{24}$$

The clutter backscatter received at antenna array A shown be step 24 is $$\forall\, 0 \leq p \leq P-1: y_p(\omega_q) = K_c^T(\omega_q)x_p, \quad (25)$$

$$= K_c^T(\omega_q)W(\omega_q)K_c^*(\omega_q)S^*(\omega_q)e_p. \quad (26)$$

Stacking the P vector signals received by all the P antennas of array A given by (26) we get $$y(\omega_q) = \begin{bmatrix} y_0(\omega_q) \\ \vdots \\ y_{P-1}(\omega_q) \end{bmatrix}. \quad (27)$$

Stacking these vectors $\{y(\omega_q)\}$ for all the Q frequencies into the single vector y yields $$y = \begin{bmatrix} y(\omega_0) \\ \vdots \\ y(\omega_{Q-1}) \end{bmatrix}. \quad (28)$$

We design the reshaping filters $\{W(\omega_q), q=0, \ldots Q-1\}$ by minimizing the total energy of the vector y (given by its squared norm or Frobenius norm)

$$\|y\|_F^2 = \sum_{q=0}^{Q-1} \|K_c^T(\omega_q)W(\omega_q)K_c^*(\omega_q)\|_F^2 |S(\omega_q)|^2. \quad (29)$$

Given the additive nature of this cost function, we minimize each of its terms, which leads to $$W(\omega_q)_{opt} = \arg\min \|K_c^T(\omega_q)W(\omega_q)K_c^*(\omega_q)\|_F^2. \quad (30)$$

We solve this design problem subject to the following constraints:
 1. Unit norm: $\|W(\omega_q)\|_F^2 = 1$, $\forall \omega_q$. This avoids the trivial solution $W(\omega_q)=0$ and biasing it towards any of the Q frequencies $\omega_q$.
 2. Symmetry: $W(\omega_Q) = W(\omega_q)^H > 0$, $\forall \omega_q$, i.e., $W(\omega_q)$ is Hermitian and positive definite (or semi-definite if $K_c(\omega_q)$ is rank deficient.) The time reversal matrix $K_c^T(\omega_q)K_c^*(\omega_q)$ becomes now the time reversal anti-focusing matrix $K_c^T(\omega_q)W(\omega_q)K_c^*(\omega_q)$ To preserve the Hermitian positive definiteness (or semi-definiteness if $K_c^T(\omega_q)$ is rank deficient) of the time reversal anti-focusing, we choose our solution $W(\omega_q)$ to be symmetric and positive definite.
 3. Constant volume: $\amalg_{i=1}^{N}\omega_{ii}(\omega_q)$ is constant. Geometrically, for a matrix A, $|\det[A]|$ is the volume of the n-dimensi°onal parallelepiped whose generating edges are given by the rows (or columns) of the n×n matrix A. This volume is the largest when the generating edges are orthogonal, and, in this case, the volume is the product of the lengths of the edges, [27], [28]. By Hadamard's inequality, [28], $|W(\omega_q)| \leq \amalg_{i=1}^{N}\omega_{ii}(\omega_q)$, where $W(\omega_q)=\lfloor\omega_{ij}(\omega_q)\rfloor$. We consider this as an alternative constraint to constraining $\det\lfloor W(\omega_q)\rfloor$. We will see that this condition facilitates the derivation of the reshaping filter.

Condition (1) constrains the reshaping to have finite, non-zero, normalized energy. Condition (3) is more subtle, it is like an entropy based design. While the goal is to avoid the clutters, because we do not know where they are, we still want to illuminate uniformly as much as possible the space where the target may possibly be, and that is precisely what an entropy design accomplishes maximum uncertainty, like with a uniform distribution.

The following two results determine the reshaping filter $W(\omega_q)$: Result 1 is for $N \leq P$ while Result 2 is for $N > P$.

Result 1: Assume $N \leq P$ and $K_c(\omega_q)$, $\forall q$, is full rank. Let $\tilde{\Lambda}_q$ $$K_c(\omega_q) = U_q \tilde{\Lambda}_q V_q^H \quad (31)$$

be the singular value decomposition (SVD) of $K_c(\omega_q)$, where $$\tilde{\Lambda}_q = [\Lambda_q\, 0_{N\times(P-N)}], \quad (32)$$

$$\Lambda_q = \mathrm{diag}[\lambda_{q,1}, \ldots, \lambda_{q,N}]. \quad (33)$$

The optimal reshaping filter (30) under conditions (1) through (3) above is $$W(\omega_q)_{opt} = k_q U_q^* \Lambda_q^{-2} U_q^T, \quad (34)$$

$$= k_q[K_c^*(\omega_q)K_c^T(\omega_q)]^{-1}, \quad (35)$$

where $k_q$ is $$k_q^2 = \left(\sum_{i=1}^{N} \frac{1}{\lambda_{q,i}^4}\right)^{-1}, \quad (36)$$

$$= \left(\left\|(K_c^*(\omega_q)K_c^T(\omega_q))^{-1}\right\|_F^2\right)^{-1}. \quad (37)$$

Proof: From the SVD (31) of $K_c(\omega_q)$, it follows successively $$\|K_c^T(\omega_q)W(\omega_q)K_c^*(\omega_q)\|_F^2 = \|V_q^*\tilde{\Lambda}_q U_q^T W(\omega_q)U_q^*\tilde{\Lambda}_q V_q^T\|_F^2, \quad (38)$$

$$= \left\|\Lambda_q \underline{U_q^T W(\omega_q) U_q^*} \Lambda_q\right\|_F^2, \quad (39)$$

$$= \|\Lambda_q F \Lambda_q\|_F^2, \quad (40)$$

$$= \sum_{i=1}^{N} \lambda_{q,i}^4 |f_{ii}|^2 + \sum_i \sum_{j,i<j} \lambda_{q,i}\lambda_{q,j}(|f_{ij}|^2 + |f_{ji}|^2) \quad (41)$$

Because F is Hermitian and positive definite, this implies that $$\forall 1 \leq i \leq N:\ f_{ii} > 0, \quad (42)$$

$$\forall j:\ \lambda_{q,j} > 0. \quad (43)$$

Hence, $\|\Lambda_q F \Lambda_q\|_F^2$ is minimized by $\{f_{ij}=0,\ i\neq j\}$, which yields $$F = \mathrm{diag}\,[f_{ii}, \ldots, f_{NN}]. \quad (44)$$

Next, we determine the values of $f_{ii}$. Recall the inequality between the arithmetic and geometric means $$\sum_{i=1}^{n} a_i \geq n\sqrt[n]{\prod_{i=1}^{n} a_i}, \quad (45)$$

whenever $a_1, \ldots, a_n > 0$, with equality holding when $a_1 = a_2 = \ldots = a_n$ and $\amalg_{i=1}^{n} a_i$ is a constant. Using now condition (3), we derive that for (41) and using (45)

$$\|\Lambda_q F\Lambda_q\|_F^2 = \sum_{i=1}^N \lambda_{q,i}^4 f_{ii}^2, \qquad (46)$$

$$\geq N\sqrt[N]{\prod_{i=1}^N \lambda_{q,i}^4 f_{ii}^2}, \qquad (47)$$

$$= N\sqrt[N]{\left(\prod_{i=1}^N \lambda_{q,i}^4\right)\det|W(\omega_q)|}. \qquad (48)$$

The equality holds when $$\forall\, 1\leq i\leq N: \lambda_{q,i}^4 f_{ii}^2 = k_q^2, \qquad (49)$$

$$\forall\, 1\leq i\leq N: f_{ii} = \frac{k_q}{\lambda_{q,i}^2}. \qquad (50)$$

By condition (1), we have $$k_q^2 = \left(\sum_{i=1}^N \frac{1}{\lambda_{q,i}^4}\right)^{-1} = \left(\left\|[K_c^*(\omega_q)K_c^T(\omega_q)]^{-1}\right\|_F^2\right)^{-1}. \qquad (51)$$

This leads to the solution $$W(\omega_q)_{opt} = k_q U_q^* \Lambda_q^{-2} U_q^T. \qquad (52)$$

If we allow an arbitrary unitary transform matrix in the above equation, we then find that this solution can be further written in a compact and revealing form as $$W(\omega_q)_{opt} = k_q [K_c^*(\omega_q) K_c^T(\omega_q)]^{-1}. \qquad (53)$$

Result 2: Assume that N>P or that $K_c(\omega_q)$ is rank deficient, i.e., $1\leq r=\text{rank}\,\lfloor K_c(\omega_q)\rfloor \leq P$. Let $$K_c(\omega_q) = U_q \tilde{\Pi}_q V_q^H$$

be the singular value decomposition of $K_c(\omega_q)$, where $$\tilde{\Pi}_q = \begin{bmatrix} \Pi_q & 0_{r\times(P-N)} \\ 0_{(N-r)\times r} & 0_{(N-r)\times(P-N)} \end{bmatrix}, \qquad (54)$$

$$\Pi_q = diag[\lambda_{q,1},\ldots,\lambda_{q,r}]. \qquad (55)$$

Then, under conditions (1) through (3), $$W(\omega_q)_{opt} = k_q U_q^* \Phi_{q,r}^2 U_q^T \qquad (56)$$

$$= k_q [K_c^*(\omega_q) K_c^T(\omega_q)]^\dagger, \qquad (57)$$

where † denotes pseudo-inverse, and $$\Phi_{q,r} = diag\left[\frac{1}{\lambda_{q,1}},\ldots,\frac{1}{\lambda_{q,r}},\underbrace{0,\ldots,0}_{(N-r)}\right], \qquad (58)$$

$$k_q^2 = \left(\sum_{i=1}^r \frac{1}{\lambda_{q,i}^4}\right)^{-1} = \left(\left\|(K_c^*(\omega_q) K_c^T(\omega_q))^\dagger\right\|_F^2\right)^{-1}. \qquad (59)$$

Proof, From $$\|K_c^T(\omega_q) W(\omega_q) K_c^*(\omega_q)\|_F^2 = \|V_q^* \tilde{\Pi}_q U_q^T W(\omega_q) U_q^* \tilde{\Pi}_q V_q^T\|_F^2, \qquad (60)$$

$$= \left\|\tilde{\Pi}_q \underbrace{U_q^T W(\omega_q) U_q^*}_{F} \tilde{\Pi}_q\right\|_F^2, \qquad (61)$$

$$= \|\tilde{\Pi}_q F \tilde{\Pi}_q\|_F^2, \qquad (62)$$

$$= \sum_{i=1}^r \lambda_{q,i}^4 |f_{ii}|^2 + \sum_i \sum_{j,i<j} \pi_{q,i}\lambda_{q,j}(|f_{ij}|^2+|f_{ji}|^2). \qquad (63)$$

Notice that F is Hermitian and positive semi-definite. Minimizing the left hand side of Eqn. (63) and using condition (3) and inequality (45) yields $$\forall\, 1\leq i\leq r: f_{ii} = \frac{k_q}{\lambda_{q,i}^2}. \qquad (64)$$

Therefore, the shaping filter takes the form:

$$W(\omega_q)_{opt} = k_q U_q^* diag\left[\frac{1}{\lambda_{q,1}^2},\ldots,\frac{1}{\lambda_{q,r}^2},\underbrace{0,\ldots,0}_{(N-r)}\right]U_q^T, \qquad (65)$$

$$= k_q [K_c^*(\omega_q) K_c^T(\omega_q)]^\dagger, \qquad (66)$$

which is equation (59) in Result 2.

We now interpret the solutions (35) or (57) in the next Result. First, recall the projection operator on the column space of matrix A.

$$P_A = A(A^H A)^{-1} A^H.$$

Result 3: The reshaped signal $x_p(\omega_q)$ and the clutter returns $y_p(\omega_q)$, p=0,..., p-1, given by (24) and (26), respectively, when the reshaping filter $W(\omega_q)$ is given by Result 2, see (57); are $$[x_0(\omega_q)\ldots x_{P-1}(\omega_q)] = k_q [K_c^*(\omega_q) K_c^T(\omega_q)]^{-1} K_c^*(\omega_q) S^*(\omega_q), \qquad (67)$$

$$[y_0(\omega_q)\ldots y_{P-1}(\omega_q)] = k_q P_{K_c^T(\omega_q)} S(\omega_q). \qquad (68)$$

In particular, if P=–N and $K_c(\omega_q)$ is full rank, see Result 1 and (35), we have $$[x_0(\omega_q)\ldots x_{P-1}(\omega_q)] = k_q K_c^{-T}(\omega_q) S^*(\omega_q), \qquad (69)$$

$$[y_0(\omega_q)\ldots y_{P-1}(\omega_q)] = k_q I S(\omega_q). \qquad (70)$$

Proof: By direct substitution of (57) in (24) and (26), equations (67) and (68) follow. When P=N and $K_c(\omega_q)$ is full rank, equation (69) follows directly from (67). Also, we have that $$K_c^T(\omega_q) W(\omega_q) K_c^*(\omega_q) = k_q I, \qquad (71)$$

which leads to (70).

Result 3 shows that the reshaped time reversed signal designed for clutter mitigation unscrambles the clutter channel response. Note that in step 10, we transmit from a single antenna from array A, say antenna 1, and receive in step 12 the clutter returns at all antennas at array B. We then, at step 14, time reverse the signal received at each antenna in array B, reshape the signal at 20 in FIG. 3, and at 22 retransmit simultaneously from all these antennas at array B. If the clutter is very rich, the signals received at 24 in FIG. 3 should focus at antenna 1 at array A, from which it was transmitted initially.

The filter $W(\omega_q)$ forces this to happen—the signal refocuses at antenna 1 of array A and is zero at every other antenna at A. The clutter response can then be subtracted out in succeeding processing steps as shown at 26. Intuitively, the filters $W(\omega_q)$, $\forall q$, after the clutter response is subtracted out, reduce the imaged area to an open field, i.e., with no clutter, so that subsequent processing can assume that target only is present. We can then image the area using a simple Green's function, without requiring knowledge of the position of the scatterers.

Major Step 3: Target channel monitoring. (B→A) In this step, the environment is probed with the signal (67) at step 22. Targets may be present or absent. The "signal plus clutter components" in the received signal at step 24 (if a target is present) are $$z'_p(\omega_q) = (K_t(\omega_q) + K_c(\omega_q))^T x_p(\omega_q), \tag{72}$$

$$= z^t_p(\omega_q) + z^c_p(\omega_q), \tag{73}$$

$$= k_q(K_t^T(\omega_q)K_c^{-T}(\omega_q) + I)e_p S^*(\omega_q), \tag{74}$$

where in (74) we assumed that N=P and $K_c(\omega_q)$ is still rank. We subtract out the known component $z_p^c(\omega_q)$ due to the clutter at 26. The resulting data matrix $Z(\omega_q)$ is $$Z(\omega_q) = [z_0^t(\omega_q), z_1^t(\omega_q), \ldots, z_{P-1}^t(\omega_q)], \tag{75}$$

$$= k_q K_t^T(\omega_q) K_c^{-T}(\omega_q) S^*(\omega_q). \tag{76}$$

Major Step 4: Time reversal target focusing. (A→B) The returns from step 22, received at the antennas in array A at step 24, after the whitened clutter has been subtracted out at 26, are either noise or target response plus noise. The target response may be smeared out by the complex environment, e.g., multiple scattering from clutter to target. The goal of major step 4 is to obtain focused returns from the target by time reversing at step 28 the signals from step 26, retransmitting them into the environment at 30, and collecting back the returns at array B at step 32. The "signal plus clutter components" of the received signal at B are (again, assuming a target is present)

$$p'_p(\omega_q) = [K_t(\omega_q) + K_c(\omega_q)][z_p(\omega_q)]^* \tag{77}$$

$$= [K_t(\omega_q) + K_c(\omega_q)]k_q K_t^H(\omega_q)K_c^{-H}(\omega_q)e_p S(\omega_q) \tag{78}$$

$$= k_q K_t(\omega_q)K_t^H(\omega_q)K_c^{-H}(\omega_q)e_p S(\omega_q) + \\ k_q K_c(\omega_q)K_t^H(\omega_q)K_c^{-H}(\omega_q)e_p S(\omega_q) \tag{79}$$

$$= p_p^t(\omega_q) + p_p^c(\omega_q), \tag{80}$$

where the target component is given by $$p_p^t(\omega_q) = p'_p(\omega_q) - p_p^c(\omega_q), \tag{81}$$

$$= k_q K_t(\omega_q)K_t^H(\omega_q)K_c^{-H}(\omega_q) \cdot e_p S(\omega_q). \tag{82}$$

Grouping $P'_p(\omega_q)$, p=0, ..., P−1, into an N×N matrix $M^B$, yields the clutter focused target response matrix measured at array B $$M^B(\omega_q) = [p_0^t(\omega_q), p_1^t(\omega_q), \ldots, p_{P-1}^t(\omega_q)], \tag{83}$$

$$= k_q K_t(\omega_q) K_t^H(\omega_q) K_c^{-H}(\omega_q) S(\omega_q). \tag{84}$$

Note that $M^B(\omega_q)$ collects the returns resulting from the two steps, target channel monitoring (major step 3) and time reversal target focusing (major step 4), when we start from array B in major step 3.

Similarly, if we repeat steps 3 and 4 but starting initially from the antennas in array B, we obtain the clutter target response matrix measured at array A given by the P×P matrix $$M^A(\omega_q) = k_q K_t^T(\omega_q) K^*_t(\omega_q) K_c^{-*}(\omega_q) S(\omega_q). \tag{85}$$

Figure 4:
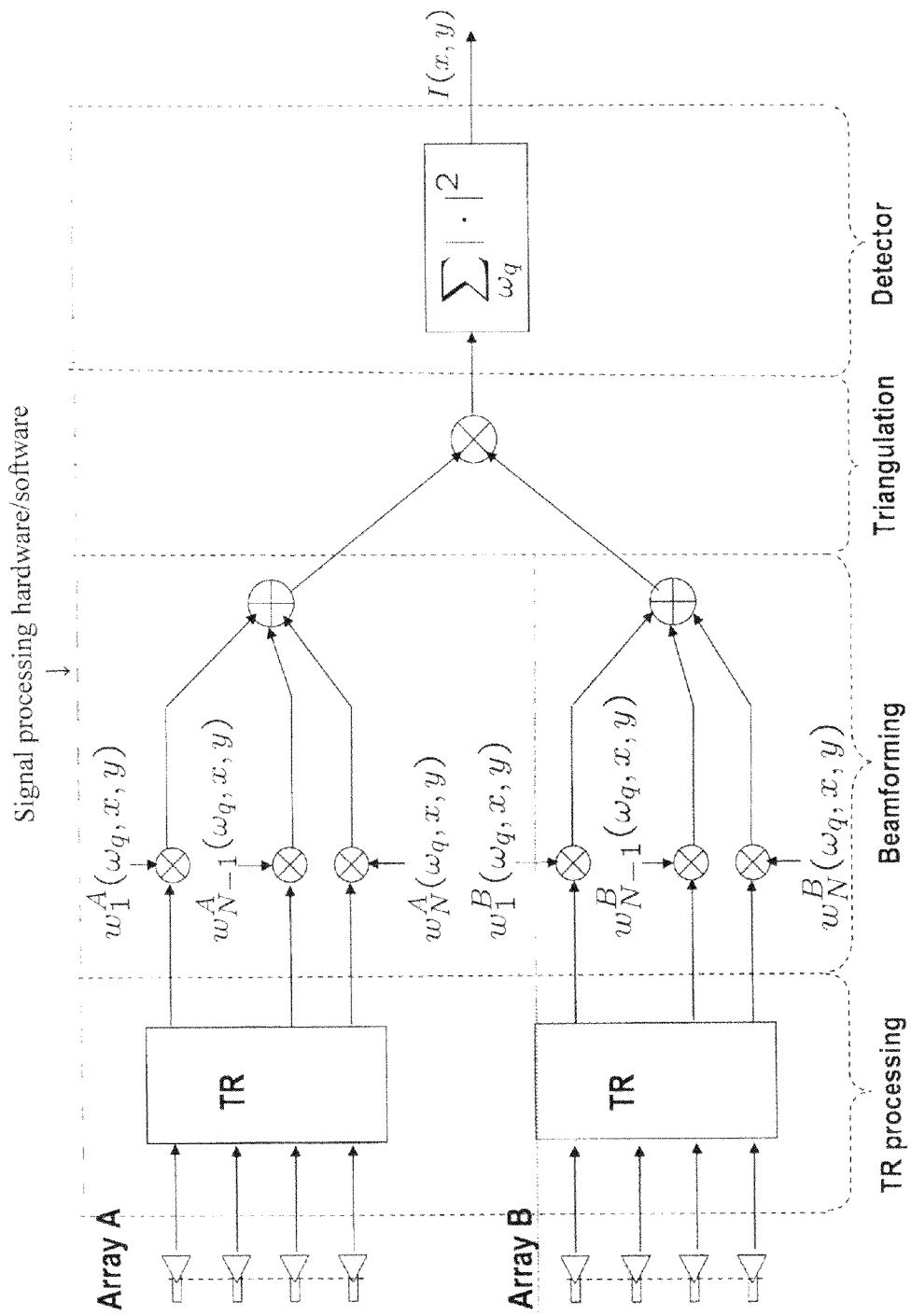
FIG. 4 illustrates two antenna arrays and associated hardware/software for performing an imaging method according to the present disclosure.

Step 5: Image formation. This final step forms the image by scanning the area of interest with two focused beams, one at array B and the other at array A. The beam at B is when we start at B and end at B; similarly, the beam at A is when we start at A and end at A. This is shown generally in FIG. 3 at 34 and in more detail in FIG. 4. FIG. 4 illustrates two antenna arrays and associated hardware/software for performing an imaging method according to the present disclosure. The hardware/software illustrated in FIG. 4 may take a variety of forms as is known to those of ordinary skill in the art. The important consideration is that the hardware/software be configured to perform the disclosed methods/algorithms.

Start with the returns $M^B(\omega_q)$ and $M^A(\omega_q)$. Let $W_{rB}(X; \omega_q)$, $W_{tB}(X; \omega_q)$, $W_{rA}(X; \omega_q)$, and $W_{tA}(X; \omega_q)$ denote the receive and transmit beams for arrays B and A, respectively, at frequency $\omega_q$, $\forall q$. Their structures are presented in the next Subsection III-B. The complex output of the beamformers B and A are $$Y^B(x; \omega_q) = w_{rB}^H(x; \omega_q) M^B(\omega_q) w_{tB}(x; \omega_q), \tag{86}$$

$$Y^A(x; \omega_q) = w_{rA}^H(x; \omega_q) M^A(\omega_q) w_{tA}(x; \omega_q). \tag{87}$$

We now combine the outputs of these two beamformers by triangulation, i.e., we multiply the output of the two beamformers at each frequency to form the final image I(x) as the spatial distribution of the total energy at each pixel x $$I(x) = \sum_{q=0}^{Q-1} |Y^A(x; \omega_q) Y^B(x; \omega_q)|^2. \tag{88}$$

Equation (88) implements the energy detector. The energy detector is a generalized likelihood ratio test for this problem, see [15]. The matched filter is not applicable because the target channel response is assumed to be unknown.

B. Weight Vectors

We design the imaging weight vectors introduced in Subsection III-A by maximizing I(x) given in (88) subject to unit norm constraints on the weight vectors as explained here. Using the subspace revealing representation (15) for the response matrices, and from equations (84), (85), and (88), we obtain $$I(x) = \tag{89}$$

$$\sum_{q=0}^{Q-1} |w_{rB}^H(x; \omega_q) M^B(\omega_q) w_{tB}(x; \omega_q)|^2 |w_{rA}^H(x; \omega_q) M^A(\omega_q) w_{tA}(x; \omega_q)|^2$$

$$= \sum_{q=0}^{Q-1} |\langle w_{rB}(x; \omega_q), g_B(x; \omega_q)\rangle|^2 \qquad (90)$$

$$\|g_A(x; \omega_q)\|^2 |\langle w_{tB}(x; \omega_q), K_c^{-1}(\omega_q)g_B(x; \omega_q)\rangle|^2 \times$$
$$|\langle w_{rA}(x; \omega_q), g_A(x; \omega_q)\rangle|^2 \|g_B(x; \omega_q)\|^2$$
$$|\langle w_{tA}(x; \omega_q), K_c^{-T}(\omega_q)g_A(x; \omega_q)\rangle|^2 \times k_q^4 |S(\omega_q)|^4 |r(x; \omega_q)|^8$$

In (90), we indicate explicitly the target reflectivity $\tau(x; \omega_q)$. Given the additivity of $I(x)$ in (90), the weight vectors, which are frequency dependent, can be calculated frequency by frequency. For a unit target impulse response at $x_t = x$, the optimal weights are obtained by the following optimization $$\{w_{rB}(x; \omega_q), w_{tB}(x; \omega_q), w_{rA}(x; \omega_q), w_{tA}(x; \omega_q)\}\big|_{opt} = \qquad (91)$$
$$\arg\max_{weights} I(x)\big|_{x_t=x},$$

subject to the constraints $$\|w_{rB}(x; \omega_q)\|^2 = \|w_{tB}(x; \omega_q)\|^2 = \|w_{rA}(x; \omega_q)\|^2 = \|w_{tA}(x; \omega_q)\|^2 = 1. \qquad (92)$$

The solution is promptly found as an application of Schwartz inequality and is in the following result.

Result 4: The optimal weights (91) under the unit norm constraint (92) are $$w_{rB}(x; \omega_q) = \frac{g_B(x; \omega_q)}{\|g_B(x; \omega_q)\|}, \qquad (93)$$

$$w_{tB}(x; \omega_q) = \frac{K_c^{-1}(\omega_q)g_B(x; \omega_q)}{\|K_c^{-1}(\omega_q)g_B(x; \omega_q)\|}, \qquad (94)$$

$$w_{rA}(x; \omega_q) = \frac{g_A(x; \omega_q)}{\|g_A(x; \omega_q)\|}, \qquad (95)$$

$$w_{tA}(x; \omega_q) = \frac{K_c^{-T}(\omega_q)g_A(x; \omega_q)}{\|K_c^{-T}(\omega_q)g_A(x; \omega_q)\|}. \qquad (96)$$

Proof: As noted before, from the additivity of $I(x)$, we can perform the optimization term by term. Also, given that each term in the sum in (90) is a product of several non negative factors, optimizing each term is equivalent to optimizing each of its factors. It follows then that we optimize each transmit and receive weight vector for each array A and B independently of each other. We consider explicitly the optimization with respect to $W_{rB}(x; \omega_q)$. The optimization is $$\arg\max_{\|w_{rB}(x;\omega_q)\|=1} I(x) = \arg\max_{\|w_{rB}(x;\omega_q)\|=1} |\langle w_{rB}(x; \omega_q), g_B(x_t = x; \omega_q)\rangle|^2. \qquad (97)$$

By Schwartz inequality, (93) follows. Similarly, we obtain (94)-(96).

C. TRAIC–TR MUSIC

The TRAIC–TRBF forms the images by beamforming the returns from major step 4 at arrays A and B, and then by triangulation of the two resulting beams. In section IV, we will compare the TRAIC–TRBF imager with other alternative imagers. One of these combines TRAIC–TR with a wideband version of the subspace based location estimation algorithm Multiple Signal Classification (MUSIC). We describe this algorithm now. The motivation to consider TRAIC–TR with MUSIC is the following: in a highly cluttered environment, where there are a large number of scatterers, MUSIC is not directly applicable. Because, intuitively, TRAIC clears the field of view by minimizing and subtracting out the clutter, it should be possible to use MUSIC after TRAIC to localize targets as long as the number of targets is smaller than the number of array elements. Because we are using wideband signals, we compute the MUSIC spectrum by combining the spectrum at all frequencies through simple multiplication of the spectrum at each frequency. We detail the method.

We perform singular value decomposition of the matrices $M^B(\omega_q)$ in (84) and $M^A(\omega_q)$ in (85) to obtain $$M^B(\omega_q) = \qquad (98)$$
$$(U_t^B(\omega_q) \ U_n^B(\omega_q)) \begin{pmatrix} \Gamma_t^B(\omega_q) & 0 \\ 0 & \Gamma_n^B(\omega_q) \end{pmatrix} (V_t^B(\omega_q) \ V_n^B(\omega_q))^H,$$

$$M^A(\omega_q) = \qquad (99)$$
$$(U_t^A(\omega_q) \ U_n^A(\omega_q)) \begin{pmatrix} \Gamma_t^A(\omega_q) & 0 \\ 0 & \Gamma_n^A(\omega_q) \end{pmatrix} (V_t^A(\omega_q) \ V_n^A(\omega_q))^H,$$

where: the $N \times r_q$ matrix $U_n^B(\omega_q)$ and the $P \times T_q$ matrix $U_n^A(\omega_q)$ are the left null subspaces of matrices $M^B(\omega_q)$ and $M^A(\omega_q)$, respectively; and $r_q$ is the effective rank of $M^B(\omega_q)$ or $M^A(\omega_q)$, i.e., the number of the dominant singular values of $M^B(\omega_q)$ or $M^A(\omega_q)$. For example, we may define the number of dominant singular values for matrix $M^B(\omega_q)$ as the minimum number of singular values whose sum exceeds $$\tau \text{Tr}[M^B(\omega_q)]$$

where $0 \leq \tau \leq 1$ is close to unity (e.g., $\tau = 0.85$). The MUSIC spectrum is computed as follows:

$$I_{TRMU}(x) = \frac{1}{Q} \prod_{q=0}^{Q-1} \mathcal{P}^B(x; \omega_q)\mathcal{P}^A(x; \omega_q), \qquad (100)$$

where the factor $1/Q$ is for normalization purposes. The MUSIC spectra, at pixel x and frequency $\omega_q$, $\{P^B(x; \omega_q)\}$ and $\{P^A(x; \omega_q)\}$ are given by $$\mathcal{P}^B(x; \omega_q) = \frac{1}{\|g_B^H(x; \omega_q)U_n^B(\omega_q)\|^2 / \|g_B(x; \omega_q)\|^2}, \qquad (101)$$

$$\mathcal{P}^A(x; \omega_q) = \frac{1}{\|g_A^H(x; \omega_q)U_n^A(\omega_q)\|^2 / \|g_A(x; \omega_q)\|^2}. \qquad (102)$$

IV. Experimental Results

This section studies the performance of the TRAIC–TRBF imager, comparing it to TRAIC–TR MUSIC and to a conventional imager obtained by direct subtraction, as will be explained in subsection IV-B. We first measure real electromagnetic (EM) backscatter from clutters placed in the imaging area with no target, and then the EM backscatter when there are clutters and target(s). From these measurements, we extract the clutter channel and the clutter plus target channel frequency responses $\{K_c(\omega_q), q=0, \ldots Q-1\}$ and $\{K_{c+t}(\omega_q), q=0, \ldots, Q-1\}$, respectively. From these we compute $\{K_t(\omega_q), q=0, \ldots Q-1\}$. The data in steps 2 through 5 in Subsection III-A are then computer generated using these $K_c(w_q)$ and $K_t(w_q)$ channel responses. In other words, TRAIC–TRBF is achieved as an algorithm, with no actual retransmission of the reshaped signals. We refer to this as mathematical time reversal rather than physical time reversal, which is when we actually retransmit the time reversed signals.

We start by describing the experimental set-up and physical measurements in subsection IV-A. Subsection IV-B presents a conventional imaging method using direct subtraction (DS) beamforming (DSBF). Subsection IV-C compares the performance of four imagers for different clutter/target configurations: TRAIC–TRBF, TRAIC–TR MUSIC, DSBF, and DS MUSIC. Finally, Subsection IV-C analyzes the results to confirm that time reversal and TRAIC–TRBF improve imaging in high clutter environments.

A Physical Measurements

In this subsection, we describe successively the scattering environment, the experimental set-up, and finally the sequence of actual measurements at discrete frequencies $\omega_q$, $q=0, \ldots Q-1$ to get the clutter and the clutter plus target channel frequency response matrices $K_c(\omega_q)$ and $K_c(\omega_q)$ and $K_{c+t}(\omega_q)$, from which we get $K_t(w_q)$.

Scattering environment. The scattering environment is illustrated in FIG. 1. It contains. a number of scattering rods placed in a wood platform. The rods are a mixture of the following four types of scatterers: (1) 1.27 cm diameter (0.5") copper pipe; (2) solid dielectric pipe with outer diameter of 3.2 cm, with dielectric constant 3.7; (3) dielectric rod with copper-patches to cause frequency dependent radar-cross section; and (4) extended object, 25×10 cm aluminum box. The targets are 1.3 cm diameter copper rods.

Experimental set-up. We conducted a series of electromagnetic measurements in the 4-6 GHz frequency range, [29], uniformly sampled by Q=201 frequencies. The corresponding total waveform time length is then $$T_c = (201-1) \times \frac{1}{2 \times 10^9} = 100 \times 10^{-9} s.$$

This signal is generated by an Agilent 89610A vector signal analyzer. Both, the in-phase (I channel) and quadrature phase (Q channel) streams of the received signals are captured. Two horn antennas, both with operational bands 4-6 GHz, are used as transmit and receive antennas. Each horn antenna is mounted on a rail and moves physically to computer controlled positions to synthesize two uniform linear arrays. In our experiments, the baseline of these arrays is limited by two factors: (1) The physical dimensions of the horn antennas set a minimum inter-element spacing of 10.16 cm; and (2) the size of the absorbing wall limits the maximum length of the transmit or receive array. This limited the two arrays to P=N=10 antennas. The device noise level is set below −40 dB relative to the received signal.

Measurements. A sequence of measurements were carried out:

1) Calibration. The equipment, I-Q modulators, network analyzer, and horn antennas were carefully calibrated by an initial set of measurement.
2) Clutter channel. With the scatterers placed in their controlled positions, we measure with the I-Q modulators the response of the channel to the 201 monochromatic signals at frequencies $\omega_q$, $q=0, \ldots, Q-1$. The data is organized into the clutter channel frequency response matrices $K_c(\omega_q)$, $q=0, \ldots, Q-1$.
3) Clutter plus target channel response. With the scatterers and target placed in their locations, we measure the total clutter plus target channel frequency response matrices $K_{c+t}(\omega_q)$, $q=0, \ldots, Q-1$.

B. Conventional Imaging: Direct Subtraction (DS)

In conventional imaging, direct subtraction is commonly used to eliminate the contributions of the background and focus on objects of interest. Because from the measurements, we have both the clutter only $K_c(\omega_q)$ and the clutter plus target $K_{c+t}(\omega_q)$ channel frequency responses, by direct subtraction $$K_t(\omega_q) = K_{c+t}(\omega_q) - K_c(\omega_q). \tag{103}$$

In practice, noise and other distortions make $K_t(\omega_q)$ to be different from the target channel response. Using the subspace revealing representation (15), the target response matrix $K_t(w_q)$ is modeled as $$K_t(\omega_q) = g_B(x_t; \omega_q) g_A^T(x_t; \omega_q). \tag{104}$$

Direct subtraction beamformer (DSBF). The direct subtraction (DS) beamformer (DSBF) correlates the target response matrix $K_t(w_q)$ with normalized weight vectors $$w_B(x; \omega_q) = \frac{g_B(x; \omega_q)}{\|g_B(x; \omega_q)\|}, \tag{105}$$

$$w_A(x; \omega_q) = \frac{g_A(x; \omega_q)}{\|g_A(x; \omega_q)\|}, \tag{106}$$

at each frequency $\omega_q$, which yields the DSBF image $$I_{DSBF}(x) = \sum_{q=0}^{Q-1} \left| \frac{g_B^H(x; \omega_q) K_t(w_q) g_A^*(x; \omega_q)}{\|g_B(x; \omega_q)\| \|g_A(x; \omega_q)\|} \right|^2. \tag{107}$$

Direct subtraction MUSIC (DS MUSIC). We can also apply MUSIC to the direct subtraction approach. By singular value decomposition $$K_{t,DS}(\omega_q) = (U_t(\omega_q) U_n(\omega_q)) \begin{pmatrix} \Gamma_t(\omega_q) & 0 \\ 0 & \Gamma_n(\omega_q) \end{pmatrix} (V_t(\omega_q) V_n(\omega_q))^H, \tag{108}$$

where $U_n(\omega_q)$ and $V_n(\omega_q)$ define the null subspaces of matrix $K_t(\omega_q)$ with $r_q$ being its estimated rank. The DS–MUSIC spectrum is given by $$I_{DSMU}(x) = \frac{1}{Q} \prod_{q=0}^{Q-1} \mathcal{J}^A(x; \omega_q) \mathcal{J}^B(x; \omega_q), \tag{109}$$

where I/Q is for normalization, and $$\mathcal{J}^B(x; \omega_q) = \frac{1}{\|g_B^H(x; \omega_q) U_n(\omega_q)\|^2 / \|g_B(x; \omega_q)\|^2}, \tag{110}$$

$$\mathcal{J}^A(x; \omega_q) = \frac{1}{\|g_A^H(x; \omega_q) V_n^*(\omega_q)\|^2 / \|g_A(x; \omega_q)\|^2}. \tag{111}$$

C. Test Results

We now contrast the performance of the 4 imaging algorithms: (i) TRAIC+TRBF (ii) DSBF (iii) TRAIC+TR MUSIC (iv) DS MUSIC.

As mentioned at the beginning of this Section, we perform mathematical time reversal, rather than physical time reversal. In physical time reversal the data in steps 14 and 28 described in Subsection III-A are actually physically generated, transmitted, and measured. However, this is not necessary to image the target, and we can simply perform mathematical time reversal where the data in these steps is generated numerically using the channel responses $K_c(\omega_q)$ and $K_{c+1}(\omega_q)$ for $q=0, \ldots, Q-1$.

We performed a battery of 11 tests with different number and configuration of clutters and targets. We report in this section the results for case 8 (17 scatterers and single target) and case 6 (6 scatterers and two targets.) Lack of space prevents detailed discussion of the other cases. Table I summarizes relevant resolution results for all 11 cases.

We show for cases 8 and 6, the images I(x) at the output of the beamformers, see FIGS. 5-8. These figures show the scattering configuration. For example, with respect to FIG. 5A-5D, the 17 numbers on each plate indicate the position of the scatterers. The correct position of the target is at the cross x, while the peak of the image I(x) is at the circle o. The closer the circle to the cross, the better the localization accuracy. The cross-range and range are in the vertical and horizontal directions, respectively, with the physical dimensions as indicated in cm along each axis. To calibrate these distances, we recall that, at the center frequency, 5 GHz, the wavelength in free space is 6 cm. The color bar on the side shows the dB scale starting from 0 dB at the top (dark blue in color printing.) For each image, the total range of the color bar shows the dynamic range of the imager. For visual comparison purpose, the images in FIGS. 2 and 4 are properly scaled to the same range in dB. The sharper high contrast images provide better details, and thus better resolution.

17 Scatterers and 1 target. The templates in FIG. 5A-5D, from top to bottom, left to right, show the TRAIC+TRBF, DSBF, TRAIC-TR MUSIC, and DS MUSIC image. FIG. 6A and FIG. 6B show the projections along the cross-range (FIG. 6A) and range (FIG. 6B) of the 3D I(x) for the TRAIC-TRBF (heavy trace with x) and the DSBF (lighter trace).

There are a number of important remarks from FIGS. 5 and 6 that demonstrate the higher cross-range and range resolution provided by TRAIC-TRBF over all the other alternative algorithms. The first is the dynamic range that is about 35 dB for TRAIC-TRBF, 10 dB larger than for DSBF, and about 20 dB larger than for the MUSIC based algorithms. The higher resolution of TRAIC-TRBF is also apparent from FIG. 5, where the lobe around the target is narrower in both (cross-range and range) directions. Both points are also well made with FIG. 6, the higher resolution is apparent from much narrower main lobes and the dynamic range is a result of smaller sidelobes. Furthermore, in this case, the number of antennas (=10) is smaller than the number of scatterers (=17). The resulting images using TRAIC demonstrate that TRAIC successfully mitigates the clutters' response and focuses on the intended target.

6 Scatterers and 2 targets. FIG. 7 depicts the images formed by the same 4 algorithms now using case 6 with a total of 6 scatterers and 2 targets. FIG. 7A shows that the TRAIC-TRBF mitigates the clutter (scatterers 9,15,27,23,36 are placed in deep nulls) and focuses on both targets. The dynamic range is about 45 dB, compared with about 30 dB dynamic range for the DSBF shown in FIG. 7B, 11 dB for TRAIC-TR MUSIC shown in FIG. 7C and 22 dB for DS MUSIC shown in FIG. 7D. Both the DSBF and the DS MUSIC miss the target at range 290 cm. FIGS. 8A and 8B shows the projection of the TRAIC-TRBF and DSBF images onto cross-range and range, respectively. FIG. 8A clearly shows two high peaks for TRAIC+TR beamforming. We observe a −5 dB null between the two peaks. For the direct subtraction beamforming shown in FIG. 8B, the second peak misses the target completely.

Resolution. We consider the two dimensional point spread function (PSF) of the imager, which is its output when the targets are pointwise. The PSF is $$I(x, \bar{x}) = \sum_{q=0}^{Q-1} |w_{rB}^H(x; \omega_q) M^B(\bar{x}, \omega_q) w_{tB}(x; \omega_q)|^2 \qquad (112)$$

$$|w_{rA}^H(x; \omega_q) M^A(\bar{x}, \omega_q) w_{tA}(x; \omega_q)|^2,$$

where $\bar{x}$ is the actual source location and x is the pixel location on which the transmit and receive beams focus. Define $\Delta x = x - \bar{x}$, and $$\tilde{J}(x) = \frac{1}{I(\bar{x})} J(x) = -\frac{1}{I(\bar{x})} \frac{\partial}{\partial x}\left(\frac{\partial}{\partial x} I(x)\right)^T \bigg|_{x=\bar{x}}. \qquad (113)$$

Second order Taylor's series expansion about $\bar{x}$ of the PSF leads to $$I(x, \bar{x}) \approx 1 - \frac{1}{2}(\Delta x)^T J(x)(\Delta x), \qquad (114)$$

The diagonal elements of the inverse $\tilde{J}(x)^{-1}$, i.e., $\tilde{J}^{-1}(x)_{xx}$ and $\tilde{J}^{-1}(x)_{yy}$, evaluated at the peak of the beam-formed images are a measure of how narrow or wide the main lobe is. In other words, these values provide a quadratic description of the main lobe of (112). The analytical expression (113) is hard to obtain due to its complexity. We resort to numerical means by finite difference replacement of the second derivatives $$\frac{\partial^2}{\partial x^2}[I(x)]_{i,j}, \quad \frac{\partial^2}{\partial y^2}[I(x)]_{i,j}$$

and the mixed derivative $$\frac{\partial^2}{\partial x \partial y}[I(x)]_{i,j}$$

as approximations, defined as follows: [30]

$$\frac{\partial^2 I_{i,j}}{\partial x^2}\bigg|_{i,j} = \frac{I_{i+1,j} - 2I_{i,j} + I_{i-1,j}}{\Delta^2} + O(\Delta^2) \qquad (115)$$

$$\frac{\partial^2 I_{i,j}}{\partial y^2}\bigg|_{i,j} = \frac{I_{i,j+1} - 2I_{ij} + I_{i,j-1}}{\Delta^2} + O(\Delta^2) \qquad (116)$$

-continued $$\left.\frac{\partial^2 I_{i,j}}{\partial x \partial y}\right|_{i,j} = \frac{1}{4\Delta^2}\{3[I_{i+1,j+1} + I_{i-1,j-1}] - [I_{i-1,j+1} + I_{i+1,j-1}] - \\ 2[I_{i+1,j} + I_{i,j+1} + I_{i-1,j} + I_{i,j-1} - 2I_{i,j}]\} + O(\Delta^2)$$ (117)

where $I_{i,j}=I(x_i, y_j)$. Equation (117) uses a nine point numerical approximation to the cross second order derivative. Because $\Delta=0.75$ cm, the grid size is sufficiently small to ensure the smoothness of the numerical solution. Table I shows these quantities for all 11 cases studied. They show that, except for one of the targets in case 7, the main lobe of the TRAIC−TRBF image is consistently narrower than the main lobe of the DSBF along both the range and cross range directions.

TABLE I

RANGE RESOLUTION (x) AND CROSS RANGE RESOLUTION (y) FOR TRAIC + TRBF AND DSBF

|  | TRAIC + TRBF $(\tilde{J}^{-1})_{yy}$ | DSBF $(\tilde{J}^{-1})_{yy}$ | TRAIC + TRBF $(\tilde{J}^{-1})_{xx}$ | DSBF $(\tilde{J}^{-1})_{xx}$ | TRAIC + TRBF $(\tilde{J}^{-1})_{xy}$ | DSBF $(\tilde{J}^{-1})_{xy}$ |
|---|---|---|---|---|---|---|
| Case-1 | 12.4 | 23.1 | 144.4 | 246.0 | 7.2 | 19.2 |
| Case-2 | 12.5 | 27.2 | 129.5 | 278.4 | 15.3 | 35.2 |
| Case-3 | 34.5 | 96.0 | 339.4 | 359.7 | −42.8 | −103.2 |
| Case-4 | 13.3 | 21.0 | 131.0 | 194.2 | 4.6 | 6.0 |
| Case-5 | 22.3 | 33.2 | 233.8 | 354.6 | 31.7 | 62.8 |
| Case-6 | 19.5 | 36.0 | 218.5 | 421.3 | 22.5 | 79.6 |
|  | 55.6 | 88.4 | 766.2 | 1186.7 | 138.3 | 101.8 |
| Case-7 | 85.5 | 121.8 | 1225.8 | 1103.7 | 256.4 | −163.0 |
|  | 108.2 | 52.5 | 1273.4 | 780.0 | −333.7 | −138.8 |
| Case-8 | 16.0 | 45.0 | 289.7 | 759.1 | −17.6 | −94.9 |
| Case-10 | 15.1 | 22.9 | 150.6 | 200.0 | 6.3 | 5.9 |
| Case-13 | 24.9 | 29.8 | 256.9 | 338.3 | 43.5 | 55.1 |
|  | 165.2 | 258.2 | 2271.8 | 4395.4 | 430.9 | 770.8 |
| Case-14 | 22.8 | 39.5 | 199.6 | 403.8 | 44.8 | 91.1 |

Discussion. The effect of multiple scattering on time reversal imaging has been studied in [23], [24], [25], where the Foldy-Lax model [31] is employed. For example, references [24], [25] show that; despite the presence of non-negligible second-order contribution scattering, the time reversal imaging with MUSIC works well in predicting the scatterers' locations. However, MUSIC is limited by the condition that the number of antennas is larger than the number of scatterers, which is rare in heavy scattering environments. Another example of using the Foldy-Lax model is the maximum likelihood estimation of point scatterers reported in [23], where the locations of the scatterers and their reflectivity coefficients are estimated iteratively through the maximum likelihood approach. That is, starting from an initial estimate of the target location and updating the estimates iteratively by optimizing a chosen non-linear cost function, the algorithm in (23) generates an image of all the scatterers. However, all the examples shown in [23] use a number of antennas that is significantly larger than the number of scatterers plus target, for example, 40 antennas or 8 antennas and 3 scattering objects (scatterers plus targets). In contrast, our proposed algorithm does not attempt to estimate the locations of the clutters (i.e., the unwanted scatterers) explicitly, rather it suppresses the clutter and then focuses on the targets. This strategy avoids the problem of directly estimating the parameters of the clutter, which may be an impossible task when the number of clutters is very large. For example, we show results when using 10 antennas and 17 scatterers.

In terms of the computational complexity, our proposed TRAIC+TR BF algorithm is comparable to the conventional DS BF algorithm. For simplicity, we assume that the number of antennas in array A and B are the same (N=P), and that we do not consider the unit normalization constraint in the weight vectors (93)-(96) and (105)-{106} for the moment. Using the Big-O notation, we can show that the DS BF algorithm has the computational complexity $O(J_x J_y Q(2N^2+2N))$ $=O(J_x J_y QN^2)$, where N is the size of the weight vectors and the data matrices, Q is the number of frequencies, $J_x$ and $J_y$ are the number of pixels in range and cross range, respectively; similarly, the TRAIC+TR BF algorithm has the computational complexity $O(J_x J_y Q16N^2+QcN^3)$, where the factor $N^3$ results from inverting the matrices $K_c(\omega_q)$, and c is a small constant. In our experiments, we choose N=10, Q=201, $J_x=256$, $J_y=200$, so the numbers Q, $J_x$, $J_y$, are dominant with respect to N. Thus, the computational complexity of the TRAIC+TR BF is still comparable to that of the DS BF for a large Q, $J_x$, $J_y$, and smaller N. This conclusion still holds when the computation of the unit normalization constraint is taken into account in that the number of operations of carrying out the unit normalization for both algorithms is on the order of $O(J_x J_y QN)$.

Another important question is the effect of measurement noise. In this paper, we rely on experimental data for algorithm verification. The noise power in the collected experimental data is low relative to the signal and clutter power. The device noise is measured experimentally to be below −40 dB relative to the received signal. The analysis of the noise effect on the time reversal imaging algorithm proposed here will be reported elsewhere. Interested readers can refer to [32] where the impact of noise on time reversal detection is analyzed.

Time Reversal Beamforming for Breast Cancer Detection

X-ray mammography is the most common method to detect early stage breast cancer. Although mammography provides high quality images at low radiation doses in the majority of patients, it has limitations. Between 10-30% of women with breast cancer who undergo mammography have negative mammograms. On the other hand, approximately two-thirds of all breast lesions that are identified by mammography and biopsied turn out to be benign. The goal of increasing diagnostic accuracy and reducing patient morbidity motivates the search for alternative technologies for early breast cancer detection.

One such alternative is microwave imaging. It has been long recognized that there is the potential of microwave radiation for diagnostic imaging [34], for example, tomography [35], ultra-wideband radar technique [36] and beamforming [37]. The microwave exam involves the propagation of very low levels of microwave energy through breast tissue to measure electrical properties. The physical basis for microwave imaging is the significant contrast of the dielectric properties between malignant and normal breast tissues [38]. Generally, tumors have been found to have more water and blood than regular tissue. Among the proposed microwave imaging techniques, the beamforming approach seeks to identify the presence and location of significant backscattered energy from malignant breast tumors using controlled microwave sources. For a beamforming imager, each antenna transmits a low power ultra-wide band signal into the breast and records the backscatter. The backscatter signals are passed through the beamformer, followed by a detector. By scanning through the whole imaged area, the output of the detector produces an image of the backscattered energy as a function of location in the breast. Having a significant dielectric contrast with normal breast tissues, malignant tumors produce localized regions of relatively large backscatter energy and stand out in the image.

Breast tissues are generally inhomogeneous. The skin layer and the small variation of the dielectric properties of the breast tissues are the main source of clutter, which degrades the formed breast images. Time reversal is an adaptive waveform transmission scheme that best matches to the target response. An electromagnetic TR experiment was reported in [39].

In the first section of this disclosure, we have disclosed a time reversal beamforming technique and showed that it successfully mitigates clutter and focuses on a target. The resulting images show higher resolution than conventional beamformers. To study the feasibility of time reversal beamforming for locating breast tumors, we use the FDTD, a computational electrodynamics modeling technique, to simulate the interactions between electromagnetic waves and the surrounding breast tissues. locating targets We use a simplified breast model to carry out FDTD simulations (see FIG. 9). A patient lies in a prone position with the breasts immersed in a liquid. The liquid has similar electrical properties to the breast tissue, but has lower loss. Two arrays of six antennas, A and B, are placed in the liquid, and positioned in a circle around the breast. The antennas are 2 cm away from the breast surface. The data is acquired in a multistatic fashion. Signals are transmitted from array A, one antenna at a time, and recorded by all the antennas of array B.

A breast may include normal breast tissue, malignant tumor, and skin. The breast model shown in FIG. 9 is a half sphere of a diameter 6 cm. Although this model is not realistically shaped, it is a reasonable simplification for malignant tumor detection in two-dimensional cross sections. Next, we choose the electrical properties of the breast model. Breast tissue dielectric properties, including the relative permittivity, $\in_r$, and conductivity $\sigma$ at various frequency ranges are measured and studied by many researchers (see, e.g., [38]). In this disclosure, we choose the breast tissue dielectric data similar to those selected by [36]. For simplicity, tissue dielectric properties are assumed to be frequency independent. The electrical properties of the normal breast tissues are $\in_r=9$, $\sigma=0.4$ S/m. We introduce a 16% upper bound of variability in the breast tissue to represent the inhomogeneities. The skin is modeled as a 1-mm thick layer with $\in_r=36$, $\sigma=$S/m. The tumor is modeled as a sphere of diameter 2-mm with $\in_r=50$, $\sigma=4$ S/m. The antenna arrays are placed in a liquid with $\in_r=9$, $\sigma=0$ S/m. We will examine two cases for simulation. One is when the conductivity of all the tissues is zero, which represents a reciprocal and lossless channel. The other is when the conductivity is non-zero and indicates a weakly lossy channel.

We developed a two-dimensional FDTD model of the breast in FIG. 9 to simulate the back-propagated wave field. The FDTD grid cell size is chosen 0.5×0.5 mm². The resulting FDTD grid is terminated with the Perfect Matched Layer (PML) absorbing boundary condition. The probing signal is a sine signal of 2 GHz bandwidth with center frequency of 9 GHz. The FDTD simulated data are time domain samples, and can be converted to frequency domain via the Fourier transform.

We now test our beamforming algorithm using simulated data by the FDTD method. In an ideal case, we can extract the tumor signature response by subtracting the wave fields calculated from a model with and without the tumor, i.e., target response $K_t(\omega_q)$ defined in [38]. We implement the TR beamformer and compare it to the conventional beamformer defined as follows:

$$I(x)_{DSBP} = \sum_{q=0}^{Q-1} |g_A(x;\omega_q)K_t(\omega_q)g_B(x;\omega_q)|^2$$

In practice, we must estimate the clutter response. The main source of the clutter is the skin layer and the random variation of the dielectric properties of the breast tissue. From our simulated FDTD time domain waveform, we observe that the returned signal has a strong leading reflection followed by other reflections. This strong reflection is caused by the skin-breast interface, while the trailing reflections are due to either the tumor or the breast tissues. Thus, we can apply a time domain gating scheme to isolate the strong skin reflections, i.e., the dominant clutter, and estimate it across the receive array. The estimated clutter response is used to construct the clutter whitening filter (i.e., the reshaping filter). We show that this adaptive time reversal clutter mitigation scheme results in a better performance compared with a direct subtraction scheme.

The layered structure of the breast model imposes difficulty in computing the Green's function. In our model, the dielectric properties of the liquid and the average breast tissue is the same, but the skin is different. Thus, the skin manifests itself as an inhomogeneous medium. However, the thickness of the skin is small relative to the wavelength. Thus, the overall influence of the skin on the Green's function can be approximated as a decaying factor.

FIGS. 10A and 10B illustrate images produced by the TR beamformer and the conventional beamformer, respectively, when the conductivity constants are set to zero. Thus, the scattering medium is lossless and the reciprocity holds. The image produced by the TR beamformer has a dynamic range of 50 dB, while the conventional image is of 32 dB. For comparison purposes, both images are properly scaled to the same range. The sharper, higher contrast image has more details and thus a better resolution. For all the images, the cross indicates the exact tumor location, while the circle is the peak of the image. FIGS. 10a and 10B illustrate the point that the TR beamformer image has a better accuracy (1 mm bias) than the conventional beamformer image (2 mm bias).

FIG. 11A illustrates the images produced by the TR beamformer and FIG. 11B illustrates the conventional beamformer when the breast tissues have non-zero conductivity. This represents a relatively weak conducting medium of the breast. Again, the TR beamformer image has a dynamic range of 42 dB compared to the conventional image of 26 dB. The bias is 1 mm for the TR beamforming image, and 3 mm for the conventional beamforming image. The results also show that the TR beamformer can compensate for moderately conductive media, and still demonstrates its high resolution imaging capability. In the case of a strongly conducting medium, the reversed time Cauchy problem is ill-posed and unstable. Additional result are found in the paper Jin, et al., "Breast Cancer Detection by Time Reversal Imaging", published at the conference: 5th IEEE International Symposium on Biomedical Imaging: From Nano to Macro, ISBI'08, Paris, France, May 14-17, 2008, which is hereby incorporated by reference for all purposes.

While the present disclosure has been described in conjunction with preferred embodiments and a particular application, those of ordinary skill in the art will recognize that many other variations, modifications, and applications are possible. For example, other antenna configurations are possible, frequency ranges other than microwave, including sound waves could be used, and many other applications beyond detection of breast tumors may be envisioned. The present disclosure is intended to be limited only by the following claims.

References

[1] A. B. Baggeroer, W. A. Kupennan, and P. N. Mikhalevslty, "An overview of matched field methods in ocean acoustics;" *IEEE of Oceanic Engineering*, vol. 18, no. 4, pp. 401-424, April 1983.

[2] M. Fink, C. Prada, F. Wu, and D. Cassereau, "Self focusing in inhomogeneous media with time reversal acoustic mirrors," in *IEEE Ultrasonics Symposium*, vol. I. Montreal, Canada: IEEE, NJ, 1989, pp. 681-686.

[3] C. Prada, F. Wu, and M. Fink, 'The iterative time reversal mirror: A solution to self-focusing in the pulse echo mode," *J. Acoustic Society of America*, vol. 90, pp. 1119-1129, 1991.

[4] M. Fink, "Time reversal of ultrasonic fields. Part I: Basic principles," *IEEE Transactions on Ultrasonic, Ferroelectronic, and Frequency Control*, vol. 39, no. 5, pp. 555-566, September 1992.

[5] M. Fink, "Time reversed acoustics," *Physics Today*; vol. 50, no. 3, pp. 34-40, 1997.

[6] M. Fink, D. Casserean, A. Derode, C. Prada, P. Roux, M. Tanter, J.-L. Thomas, and F. Wu, "Time-reversed acoustics," *Reports on Progress in Physics*, vol. 63, no. 12, pp. 1933-1995, December 2000.

[7] W. A. Kuperman, W. S. Hodgkiss, and H. C. Song, "Phase conjugation in the ocean: Experimental demonstration of an acoustic time-reversal mirror," *J Acoustic Society of America*, vol. 103, no. 1, pp. 25-40, January 1998.

[8] H. C. Song, W. A. Kuperman. W. S. Hodgkiss, T. Akal, and C. Ferla, "Iterative lime reversal in the ocean," *J. Acoustic Society of America*, vol. 105, no. 6, pp. 3176-3184, June 1999.

[9] B. E. Henty and D. D. Stancil, "Multipath enabled super-resolution for RF/microwave communication using phase-conjugate arrays," *Physical Review Letters*, vol. 93, no. 24, p. 243904, December 2004.

[10] S. K. Lehman and A. J. Devaney, "Transmission mode time-reversal super-resolution imaging," *J. Acoustic Society of America*, vol. 113, no. 5, pp. 2742-53, May 2003.

[11] A. J. Devaney, "Time reversal imaging of obscured targets from multistatic data," *IEEE Transaction on Antennas and Propagation*, vol. 53, no. 5, pp. 1600-1610, May 2005.

[12] C. Prada and J,-L. Thomas, "Experimental subwavelength localization of scatterers by decomposition of the time reversal operator interpreted as a covariance matrix," *J. Acoust. Soc. Am.*, vol. 114, no. 1, pp. 235-243, July 2004.

[13] L. Borcea, G. Papanicolaou, C. Tsogka, and J. Berryman, "Imaging and time reversal in random media," *Inverse Problems*, vol. 18, pp. 1247-1289, 2002.

[14] C. Oestges, A. D. Kim, G. Papanicolaou, and A. J. Paulraj, "Characterization of space time focusing in time reversed random fields," *IEEE Transactions on Antennas and Propagation*, vol. 53, no. 1, pp. 283-293, January 2005.

[15] J. M. F. Moura and Y. Jin, "Detection by time reversal: Single antenna," *IEEE Transactions on Signal Processing*, vol. 55, no. 1, pp. 187-201, January 2007.

[16] A. V. Oppenheim, A. S. Willsky, and S. H. Nawab, *Signals & Systems, 2nd edition*. Upper Saddle River, N.J.: Prentice-Hall, Inc., 1996.

[17] D. R. Wehner, *High Resolution Radar*. Norwood, Mass.: Artech House, 1994.

[18] B. R. MahalZa and A. Z. Elsherbeni, *MATLAB Simulations for Radar System Design*. Baco Raton, Fla.: CRC Press, 2003.

[19] A. J. Devaney, "Using field correlations to estimate Green's functions from experimental data," 2004, (Unpublished manuscript.).

[20] D. H. Chambers and J. G. Berryman, "Analysis of the time reversal operator for a small Spherical scatterer in an electromagnetic field," *IEEE Transactions On Antennas and Propagation*, vol. 52, no. 7, pp. 1729-1738, July 2004.

[21] R. E. Jorgenson and R. Mittra, "Efficient calculation of the free space periodic Green's function," *IEEE Transactions on Antennas and Propagation*, vol. 38, no. 5, pp. 633-642, May 1990.

[22] P. M. Morse and H. Feshback, *Methods of Theoretical Physics, Part I*. New York, N.Y.: McGraw-Hill, 1953.

[23] G. Shi and A. Nehorai, "Maximum likelihood estimation of point scatterers for computational time-reversal imaging," *Communications in Information and Systems*, vol. 5, no. 2, pp. 227-256, 2005.

[24] A. J. Devaney, E. A. Marengo, and F. K. Gruber, "Time-reversal-based imaging and inverse scattering of multiply scattering point targets," *J. Acoust. Soc. Am.*, vol. 118, no. 5, pp. 3129-3138, November 2005.

[25] F. K. Gruber, E. A. Marengo, and A. J. Devaney, "Time-reversal imaging with multiple signal classification considering multiple scattering between the targets," *J. Acoust. Soc. Am.*, vol. 115, no. 6, pp. 3042-3047, June 2004.

[26] J. M. F. Moura, Y. Jin, D. Stancil, J. Zhu, A. Cepni, Y. Jiang, and B. Henty, "Single antenna time reversal adaptive interference cancelation," in *ICASSP'05, IEEE International Conference on Signal Processing*, vol. IV. Philadelphia, Pa.: IEEE, March 2005, pp. 1121-1124.

[27] S. Boyd, L. E. Ghaoui, E. Feron, and V. Balakrishnan, *Linear Matrix Inequalities in System and Control Theory*. Philadelphia, Pa.: SIAM Studies in Applied Mathematics, 1994.

[28] R. A. Horn and C. R. Johnson, *Matrix Analysis*. New York; Cambridge University Press, 1985.

[29] A. Cepni, "Experimental investigation of time-reversal techniques using electromagnetic waves," Ph.D. dissertation, Carnegie Mellon University, Department of Electrical and Computer Engineering, December 2005.

[30] A. R. Mitchell and D. F. Griffiths, *The Finite Difference Method in Partial Differential Equations*. New York, N.Y.: John Wiley & Sons, 1980.

[31] R. K. Snieder and J. A. Scales, "Time-reversal imaging as a diagnostic of wave and particle chaos,"*Physical Review E*, vol. 58, no. 5, pp, 5668-5675, November 1998.

[32] Y. Jin and J. M. F. Moura, "Asymptotic noise analysis of time reversal detection," in *The 40th Asilomar Conference*

[32] on *Signals, Systems and Computers* 2006. Pacific Grove, Calif.: IEEE, Oct. 29-Nov. 1, 2006, pp. 772-776.

[33] Y. Jin and J. M. F. Moura, "TR-SAR: Time reversal target focusing in synthetic aperture radar," Proceedings of the International Conference on Acoustics, Speech and Signal Processing (ICASSP'07), April 2007, pp. 957-960.

[34] L. E. Larsen and J. H. Jacobi, *Medical Applications of Microwave Imaging*. New York, N.Y.: IEEE Press, 1986.

[35] P. M. Meaney, M. W. Fanning, D. Li, S. P. Poplack, and K. D. Paulsen, "A clinical prototype for active microwave imaging of the breast," *IEEE Transactions on Microwave Theory and Techniques*, vol. 48, pp. 1841-1853, November 2000.

[36] E. C. Fear and M. A. Stuchly, "Microwave detection of breast cancer," *IEEE Transactions on Microwave Theory and Techniques*, vol. 48, no. 11, pp. 1854-1863, August 2000.

[37] E. J. Bond, X. Li, S.C. Hagness, and B. D. V. Veen, "Microwave imaging via space-time beamforming for early detection of breast cancer," *IEEE Transactions on Antennas and Propagation*, vol. 51, no. 8, pp. 1690-1705, August 2003.

[38] A. J. Surowiec, S. S. Stuchly, J. R. Barr, and A. Swarup, "Dielectric properties of breast carcinoma and the surrounding tissues," *IEEE Transactions on Biomedical Engineering*, vol. 35, no. 4, pp. 257-263, April 1988.

[39] B. E. Henty and D. D. Stancil, "Multipath enabled super-resolution for RF/microwave communication using phase-conjugate arrays," *Physics Review Letters*, vol. 93, no. 24, p. 243904, December 2004.

What is claimed is:

1. A method of characterizing a transmission channel using time reversal, comprising:
   physically transmitting signals from a first location through a channel having a plurality of non-targets to a second location;
   receiving the transmitted signals at the second location;
   time reversing the received signals; and
   constructing a reshaping filter configured to reshape the time reversed signals so as to minimize a total return from the plurality of non-targets at once, wherein said reshaping filter represents a characterization of the transmission channel.

2. The method of claim 1 wherein said transmitting comprises transmitting a series of pulses sequentially from each of a plurality of antennas in an antenna array at said first location.

3. The method of claim 2 wherein said receiving the transmitted signals comprises receiving a return at each of a plurality of antennas in an antenna array at said second location in response to each transmitted pulse.

4. The method of claim 1 wherein said constructing a reshaping filter $W(\omega_q)$ at each frequency $\omega_q$ comprises minimizing the function $\|K^T_c(\omega_q)W(\omega_q)K^*_c(\omega_q)\|^2_F$ where:
   $K^T_c(\omega_q)$ is the transpose of the response matrix $K_c(\omega_q)$ at the frequency $\omega_q$ without the target,
   $K^*_c(\omega_q)$ is the conjugate of the response matrix $K_c(\omega_q)$,
   $\|.\|^2_F$ is the Frobenius norm, and
   $\omega_q$, $q=0, \ldots, Q-1$.

5. The method of claim 1 additionally comprising repeating the steps of claim 1 and wherein said constructing a reshaping filter $W(\omega_q)$ at frequency $\omega_q$ is comprised of constructing a reshaping filter based on an average of said received signals.

6. The method of claim 1 wherein said physically transmitting through a channel comprises physically transmitting through tissue.

7. The method of claim 6 wherein said physically transmitting through tissue comprises physically transmitting through human breast tissue.

8. A method of generating a target focused data matrix, comprising:
   physically transmitting a plurality of signals from a second location through a channel having a plurality of non-targets and a target to a first location, said plurality of signals being reshaped by a reshaping filter so as to minimize a total return from the plurality of non-targets at once;
   receiving the transmitted signals at the first location;
   subtracting out of the received signals the total return from the plurality of non-targets;
   time reversing the signals produced in the previous step; and
   retransmitting the time reversed signals from the first location to the second location to produce a target focused data matrix.

9. The method of claim 8 wherein said transmitting a first plurality of signals comprises transmitting a sequential series of simultaneous pulses from each of a plurality of antennas in an antenna array at said second location.

10. The method of claim 9 wherein said receiving the transmitted signals comprises receiving a return at a single antenna in an antenna array at said first location in response to each series of simultaneously transmitted pulses.

11. The method of claim 8 wherein said reshaping filter $W(\omega_q)$ at each frequency $\omega_q$ is designed to minimize the function $\|K^T_c(\omega_q)W(\omega_q)K^*_c(\omega_q)\|^2_F$ where:
   $K^T_c(\omega_q)$ is the transpose of the response matrix $K_c(\omega_q)$ at the frequency $\omega_q$ without the target,
   $K^*_c(\omega_q)$ is the conjugate of the response matrix $K_c(\omega_q)$,
   $\|\ \|^2_F$ is the Frobenius norm, and
   $\omega_q$, $q=0, \ldots, Q-1$.

12. The method of claim 8 wherein said retransmitting the time reversed signals is performed by physically transmitting the time reversed signals.

13. The method of claim 8 wherein said physically transmitting through a channel comprises physically transmitting through tissue.

14. The method of claim 13 wherein said physically transmitting through tissue comprises physically transmitting through human breast tissue.

15. A method of generating an image, comprising:
   physically transmitting a first plurality of signals from a first location through a channel having a plurality of non-targets to a second location;
   receiving the transmitted signals at the second location;
   time reversing the received signals;
   using a reshaping filter configured to reshape the time reversed received signals so as to minimize a return from the non-targets to produce a second plurality of reshaped, time reversed signals;
   physically transmitting the reshaped, time reversed signals from the second location to the first location;
   receiving the second plurality of transmitted signals at the first location;
   subtracting out of the received signal returns from non-targets;
   time reversing the signals produced in the previous step to focus on the target;
   retransmitting the time reversed signals from the first location to the second location to produce a target focused data matrix identifying an area of interest;

scanning the area of interest with two focused beams, one beam transmitted from the first location and one beam transmitted from the second location; and combining the returns from the two scans to form an image.

16. The method of claim 15 wherein said transmitting a first plurality of signals comprises transmitting a sequential series of simultaneous pulses from each of a plurality of antennas in an antenna array at said second location.

17. The method of claim 16 wherein said receiving the transmitted signals comprises receiving a return at a single antenna in an antenna array at said first location in response to each series of simultaneously transmitted pulses.

18. The method of claim 15 wherein said reshaping filter $W(\omega_q)$ at each frequency $\omega_q$ is designed to minimize the function $\|K^T_c(\omega_q)W(\omega_q)K^*_c(\omega_q)\|^2_F$ where:

$K^T_c(\omega_q)$ is the transpose of the response matrix $K_c(\omega_q)$ at the frequency $\omega_q$ without the target, $K^*_c(\omega_q)$ is the conjugate of the response matrix $K_c(\omega_q)$, $\| \|^2_F$ is the Frobenius norm, and $\omega_q$, $q=0, \ldots, Q-1$.

19. The method of claim 15 wherein said retransmitting the time reversed signals is performed by physically transmitting the time reversed signals.

20. The method of claim 15 wherein said physically transmitting through a channel comprises physically transmitting through tissue.

21. The method of claim 20 wherein said physically transmitting through tissue comprises physically transmitting through human breast tissue.

22. A system comprising first and second antennas and signal processing hardware configured to perform a method of characterizing a transmission channel using time reversal, comprising:

physically transmitting signals from a first antenna through a channel having a plurality of non-targets to a second antenna;

receiving the transmitted signals at the second antenna;

time reversing the received signals; and constructing a reshaping filter configured to reshape the time reversed signals so as to minimize a total return from the plurality of non-targets at once, wherein said reshaping filter represents a characterization of the transmission channel.

23. A system comprising first and second antennas and signal processing hardware configured to perform a method of generating a target focused data matrix, comprising:

physically transmitting a plurality of signals from a second antenna through a channel having a plurality of non-targets and a target to a first antenna, said plurality of signals being reshaped by a reshaping filter so as to minimize a total return from the plurality of non-targets at once;

receiving the transmitted signals at the first antenna;

subtracting out of the received signals the total return from the plurality of non-targets;

time reversing the signals produced in the previous step; and retransmitting the time reversed signals from the first antenna to the second antenna to produce a target focused data matrix.

24. A system comprising first and second antennas and signal processing hardware configured to perform a method of generating an image, comprising:

physically transmitting a first plurality of signals from a first antenna through a channel having a plurality of non-targets to a second antenna;

receiving the transmitted signals at the second antenna;

time reversing the received signals;

using a reshaping filter configured to reshape the time reversed received signals so as to minimize a return from the non-targets to produce a second plurality of reshaped, time reversed signals;

physically transmitting the reshaped, time reversed signals from the second antenna to the first antenna;

receiving the second plurality of transmitted signals at the first antenna;

subtracting out of the received signal returns from non-targets;

time reversing the signals produced in the previous step to focus on the target;

retransmitting the time reversed signals from the first antenna to the second antenna to produce a target focused data matrix identifying an area of interest;

scanning the area of interest with two focused beams, one beam transmitted from the first antenna and one beam transmitted from the second antenna; and combining the returns from the two scans to form an image.

* * * * *